US011200812B2

(12) United States Patent
Biddle et al.

(10) Patent No.: US 11,200,812 B2
(45) Date of Patent: Dec. 14, 2021

(54) MINIATURE, PORTABLE MOTION PLATFORMS FOR SIMULATING FLIGHT MOVEMENTS

(71) Applicant: The Boeing Company, Chicago, IL (US)

(72) Inventors: Elizabeth Marie Biddle, Orlando, FL (US); Anthony Pat Starace, Winter Park, FL (US); Shawn Stafford, Oviedo, FL (US)

(73) Assignee: THE BOEING COMPANY, Chicago, IL (US)

( * ) Notice: Subject to any disclaimer, the term of this patent is extended or adjusted under 35 U.S.C. 154(b) by 574 days.

(21) Appl. No.: 16/049,451

(22) Filed: Jul. 30, 2018

(65) Prior Publication Data

US 2020/0035117 A1 Jan. 30, 2020

(51) Int. Cl.
*G09B 9/12* (2006.01)

(52) U.S. Cl.
CPC .................................... *G09B 9/12* (2013.01)

(58) Field of Classification Search
CPC ... G09B 9/00; G09B 9/02; G09B 9/04; G09B 9/08; G09B 9/12
See application file for complete search history.

(56) References Cited

U.S. PATENT DOCUMENTS 6,106,298 A * 8/2000 Pollak .................... G09B 9/003 434/29
2002/0115043 A1* 8/2002 Baker ...................... G09B 9/08 434/30
2010/0028837 A1* 2/2010 Holloway ................ G05G 1/38 434/30
2010/0266991 A1 10/2010 Gregoire et al.
2014/0302462 A1* 10/2014 Vatcher .................. A63G 31/16 434/55
2015/0157951 A1* 6/2015 Lee ........................ A63G 31/16 472/130
2016/0140862 A1* 5/2016 Van Lookeren Campagne ........... G09B 9/14 434/55

(Continued)

FOREIGN PATENT DOCUMENTS

| | | |
|---|---|---|
| CN | 101034503 | 9/2007 |
| CN | 105013178 | 11/2015 |
| WO | 2018094922 | 5/2018 |

OTHER PUBLICATIONS

European Patent Office, "Extended Search Report," issued in connection with European Patent Application No. 19188733.0, dated Sep. 23, 2019, 8 pages.

(Continued)

*Primary Examiner* — Timothy A Musselman
(74) *Attorney, Agent, or Firm* — Hanley, Flight & Zimmerman, LLC

(57) ABSTRACT

Miniature, portable motion platforms for simulating flight movements are described. Example portable motion platforms includes a base, a seat frame, and six actuators. The seat frame is configured to support a seat. The actuators are arranged in a Stewart platform configuration and are to move the seat frame relative to the base with six degrees of freedom. Each one of the actuators has a corresponding first end coupled to the base and a corresponding second end coupled to the seat frame.

31 Claims, 15 Drawing Sheets

200
206 206 210 206 206 206 202 204 206 202 204 206 202 206 202 202 204 204 202 204 204 208
Z 214 0 Y X 212
210 206 206 206 202 202 204 206 206 202 204 202 204 202 204 204 204 208

(56) References Cited

U.S. PATENT DOCUMENTS

| | | | | |
|---|---|---|---|---|
| 2017/0025031 | A1 | 1/2017 | Dreyer et al. | |
| 2019/0244537 | A1* | 8/2019 | Liberatore ............... | G09B 9/14 |

OTHER PUBLICATIONS

Allerton, "Flight simulation—past, present and future," The Aeronautical Journal, Dec. 2000, 14 pages.
Bürki-Cohen et al., "Simulator Platform Motion—The Need Revisited," The International Journal of Aviation Psychology, vol. 8, No. 3, 1998, pp. 293-317, 28 pages.
Popescu et al., "Dynamic Flight Simulators—the Ongoing Paradigm in Training High Performance Pilots," The 12th International Scientific Conference eLearning and Software for Education Bucharest, Apr. 21-22, 2016, 8 pages.
Virtogo, "The Cyber Air Cylinder Base," retrieved from [http://www.motioncontrolsllc.com/virtogo] on Jul. 11, 2018, 5 pages.
European Patent Office, "Communication pursuant to Article 94(3) EPC," issued in connection with European Patent Application No. 19188733.0, dated Sep. 10, 2020, 6 pages.

* cited by examiner 200
210
206
202
204
208
Z
Y
X
0
212
220

MINIATURE, PORTABLE MOTION PLATFORMS FOR SIMULATING FLIGHT MOVEMENTS

FIELD OF THE DISCLOSURE

This disclosure relates generally to motion platforms and, more specifically, to miniature, portable motion platforms for simulating flight movements.

BACKGROUND

Pilot training (e.g., commercial pilot training, military pilot training, etc.) commonly involves the use of a full-size flight simulator that is structured to artificially recreate aircraft flights and/or the environments in which such aircraft flights occur. Conventional full-size flight simulators typically have large horizontal and vertical dimensions (e.g., twenty feet wide by twenty feet high), and are accordingly installed and/or housed in equally large facilities (e.g., a room and/or area that is forty feet wide by forty feet high).

The installation of a conventional full-size flight simulator is typically permanent, as the size (and the associated weight) of such a simulator makes any subsequent relocation of the simulator following installation impractical. The cost of producing and installing a full-size flight simulator can be in the range of tens of millions of dollars. Once installed, a full-size flight simulator can require extensive maintenance, and such maintenance must be performed at the installation site.

SUMMARY

Miniature, portable motion platforms for simulating flight movements are disclosed. In some disclosed examples, a portable motion platform apparatus comprises a base, a seat frame, and six actuators. In some disclosed examples, the seat frame is configured to support a seat. In some disclosed examples the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame.

In some disclosed examples, a portable motion platform comprises a base, a seat frame, and six actuators. In some disclosed examples, the base has a first width not exceeding thirty-six inches. In some disclosed examples, the seat frame has a second width not exceeding thirty-six inches. In some disclosed examples, the seat frame is configured to support a seat. In some disclosed examples, the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame. In some disclosed examples, the first ends define a first circumference, and the second ends define a second circumference that is less than the first circumference.

In some disclosed examples, a portable motion platform apparatus comprises a base, a seat frame, and six actuators. In some disclosed examples, the base has a first width not exceeding thirty-six inches. In some disclosed examples, the base is selectively supported by detachable wheels. In some disclosed examples, the detachable wheels are to facilitate movement of the base relative to an underlying surface when the detachable wheels are attached to the base. In some disclosed examples, the seat frame has a second width not exceeding thirty-six inches. In some disclosed examples, the seat frame is configured to support a seat. In some disclosed examples, the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame.

In some disclosed examples, a portable motion platform apparatus comprises a base, a seat frame, six actuators, and a control unit. In some disclosed examples, the base has a first width not exceeding thirty-six inches. In some disclosed examples, the seat frame has a second width not exceeding thirty-six inches. In some disclosed examples, the seat frame is configured to support a seat. In some disclosed examples, the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame. In some disclosed examples, the control unit is mounted to the base and is located within a periphery of the base. In some disclosed examples, the control unit is operatively coupled to the actuators. In some disclosed examples, the control unit is configured to control actuation of the actuators based on first control signals received at the control unit from a flight simulator, and further based on second control signals to be sent from the control unit to the actuators in response to the first control signals.

In some examples, a method is disclosed. In some disclosed examples, the method comprises moving a portable motion platform through an opening located between a first area and a second area, the opening having a first width not exceeding thirty-six inches. In some disclosed examples of the method, the portable motion platform includes a base, a seat frame, and six actuators. In some disclosed examples, the base has a second width less than the first width. In some disclosed examples, the seat frame has a third width less than the first width. In some disclosed examples, the seat frame is configured to support a seat. In some disclosed examples, the six actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame.

In some examples, a method is disclosed. In some disclosed examples, the method comprises receiving first control signals at a control unit of a portable motion platform. In some disclosed examples, the first control signals are received from a flight simulator operatively coupled to the portable motion platform. In some disclosed examples of the method, the portable motion platform includes a base, a seat frame, and six actuators. In some disclosed examples, the seat frame is configured to support a seat. In some disclosed examples, the six actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame. In some disclosed examples, the method further comprises generating second control signals via the control unit in response to the first control signals. In some disclosed examples, the method further comprises transmitting the second control signals from the control unit to the actuators. In some disclosed examples, the method further comprises moving the seat frame relative to the base via the actuators in response to the second control signals.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Figure 1:
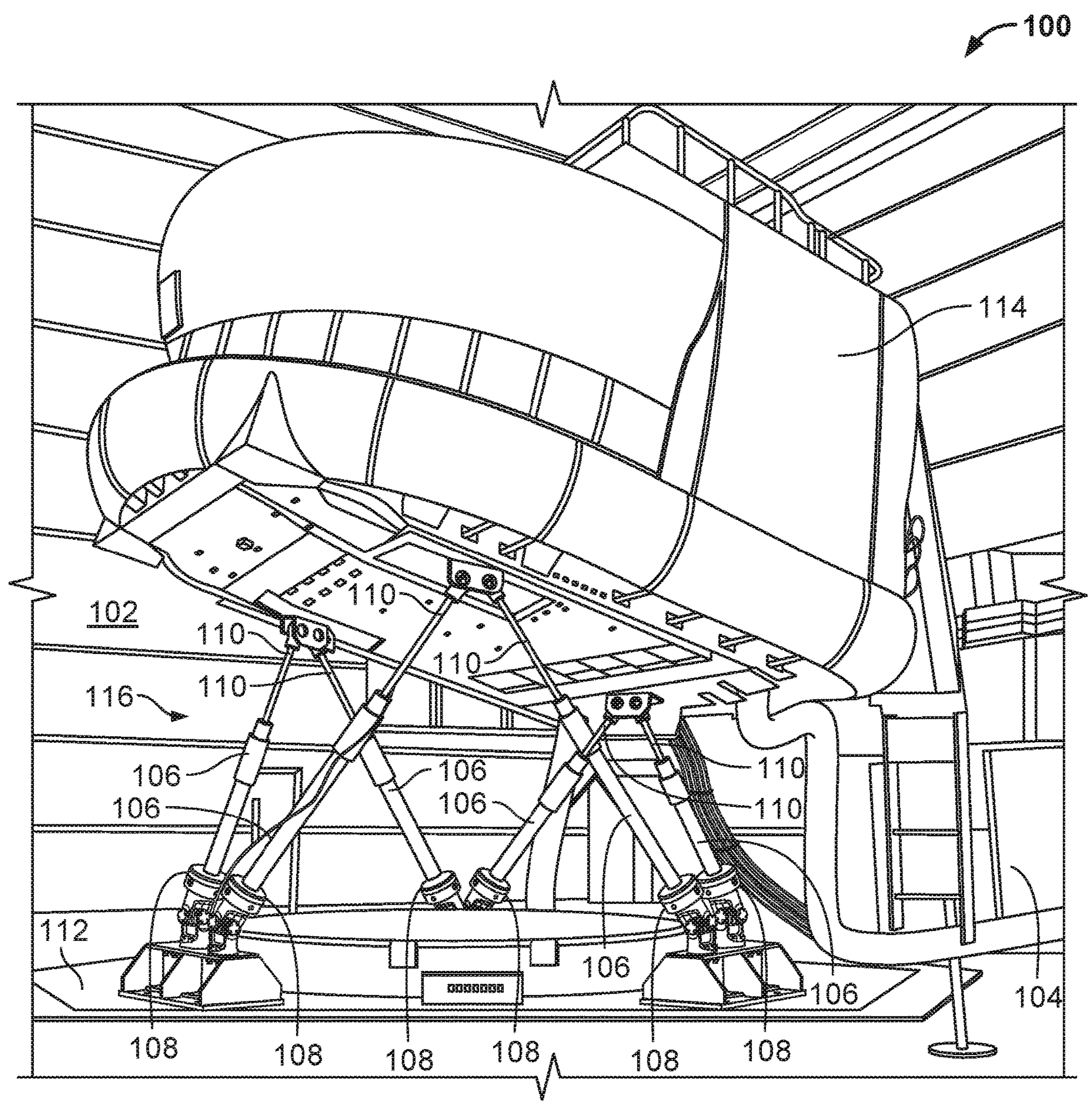
FIG. 1 is a perspective view of a known full-size flight simulator.

As discussed above, conventional full-size flight simulators typically have large horizontal and vertical dimensions (e.g., twenty feet wide by twenty feet high), and are accordingly installed and/or housed in equally large facilities (e.g., a room and/or area that is forty feet wide by forty feet high). For example, FIG. 1 is a perspective view of a known full-size flight simulator 100. The full-size flight simulator 100 of FIG. 1 has a width of approximately twenty feet and a height of approximately twenty feet. The full-size flight simulator 100 of FIG. 1 is shown in an installed and/or assembled state within a room 102 having a door 104.

The full-size flight simulator 100 of FIG. 1 is not portable. For example, the full-size flight simulator 100 of FIG. 1 is incapable of being transported and/or moved through the door 104 of FIG. 1 and reinstalled in a different location (e.g., a different room or area) absent the full-size flight simulator 100 being disassembled into substantially smaller component parts (e.g., small enough to fit through the dimensions of the door 104), moved in its component parts through the door 104, and reinstalled and/or reassembled from its component parts at the different location. Such relocation, reinstallation, and/or reassembly processes would typically be impractical based on the associated manpower, time, and costs that would necessarily be involved. Accordingly, the initial installation of the full-size flight simulator 100 of FIG. 1 in the room 102 of FIG. 1 is typically permanent.

The full-size flight simulator 100 of FIG. 1 includes six actuators 106. Each one of the actuators 106 of FIG. 1 has a corresponding first end 108 and a corresponding second end 110 located opposite the first end 108. Each one of the actuators 106 of FIG. 1 is coupled at its corresponding first end 108 to a base 112 of the full-size flight simulator 100, and is coupled at its corresponding second end 110 to a container 114 of the full-size flight simulator 100. The actuators 106 of the full-size flight simulator 100 of FIG. 1 are arranged in a Stewart platform configuration 116. As used herein in the context of describing a group of six actuators, the term "Stewart platform configuration" refers to six actuators attached in pairs at three mounting positions to a base structure (e.g., a base plate) of a platform, and attached in different pairs at three mounting positions to an upper structure (e.g., an upper plate) of the platform, such that one or more device(s) and/or structure(s) mounted on and/or placed within the upper structure can be moved in the six degrees of freedom in which it is possible for a freely-suspended body to move (e.g., three linear movements along, and three rotational movements about, the axes of a three-dimensional Cartesian coordinate system). For example, in the Stewart platform configuration 116 of FIG. 1, the six actuators 106 are attached in pairs (e.g., at their corresponding first ends 108) at three mounting positions to the base 112 of the full-size flight simulator 100, and are attached in different pairs (e.g., at their corresponding second ends 110) at three mounting positions to the container 114 of the full-size flight simulator 100, such that one or more device(s) and/or structure(s) mounted on and/or placed within the container 114 can be moved by the actuators 106 with six degrees of freedom, where each degree of freedom corresponds to one of six simulated flight movements including a pitch movement, a roll movement, a yaw movement, a surge movement, a heave movement, and a sway movement.

FIGS. 2A-2F illustrate simulated flight movements facilitated by an example Stewart platform 200. The Stewart platform 200 of FIGS. 2A-2F includes six actuators 202. Each one of the actuators 202 of FIGS. 2A-2F has a corresponding first end 204 and a corresponding second end 206 located opposite the first end 204. Each one of the actuators 202 of FIGS. 2A-2F is coupled at its corresponding first end 204 to a base structure 208 of the Stewart platform 200, and is coupled at its corresponding second end 206 to an upper structure 210 of the Stewart platform 200. More specifically, the six actuators 202 are attached in pairs (e.g., at their corresponding first ends 204) at three mounting positions to the base structure 208, and are attached in different pairs (e.g., at their corresponding second ends 206) at three mounting positions to the upper structure 210, such that the upper structure 210 can be moved by the actuators 202 with six degrees of freedom in the illustrated three-dimensional Cartesian coordinate system 212.

Figure 2A:
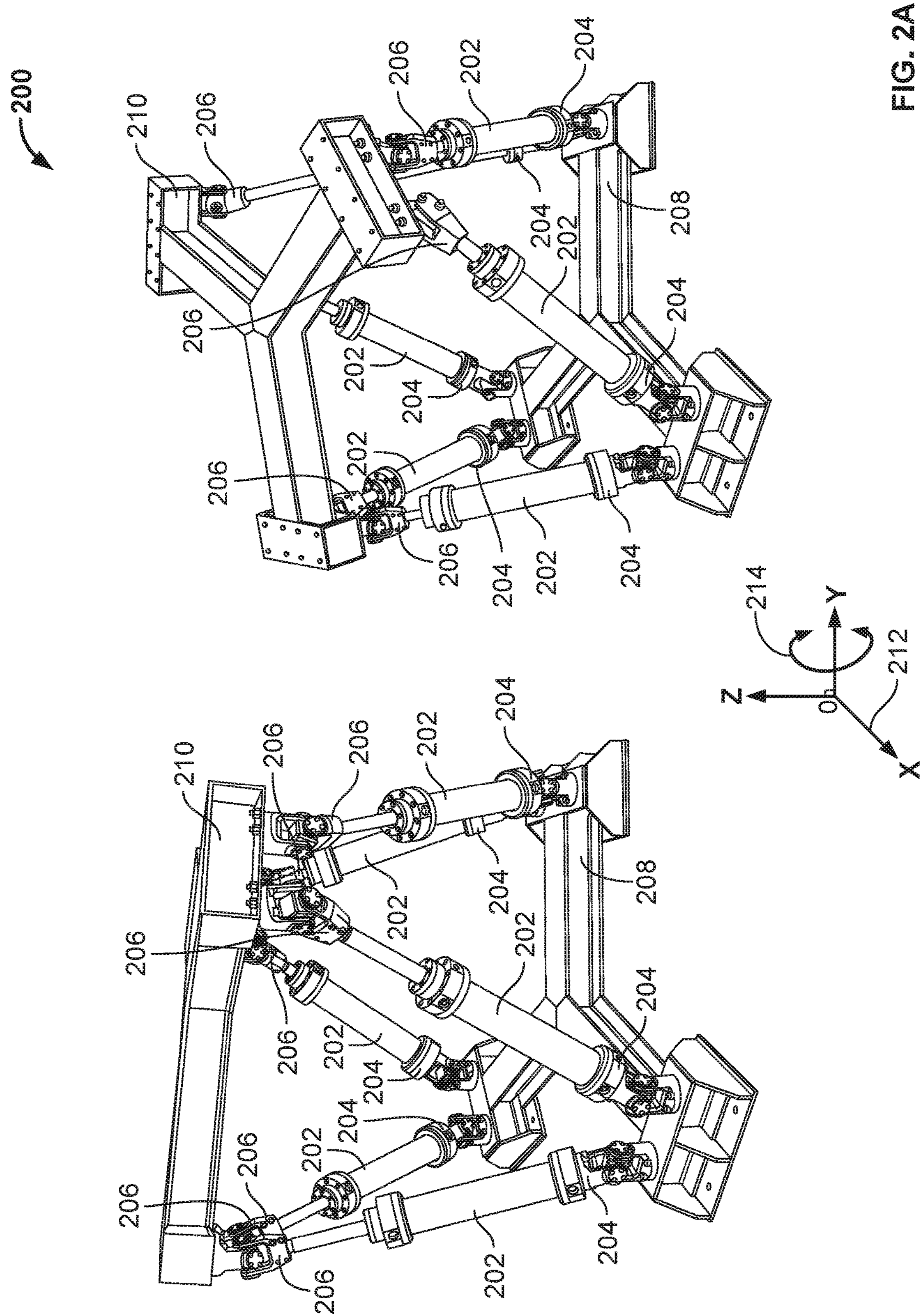
FIGS. 2A-2F illustrate simulated flight movements facilitated by an example Stewart platform.
Figure 2B:
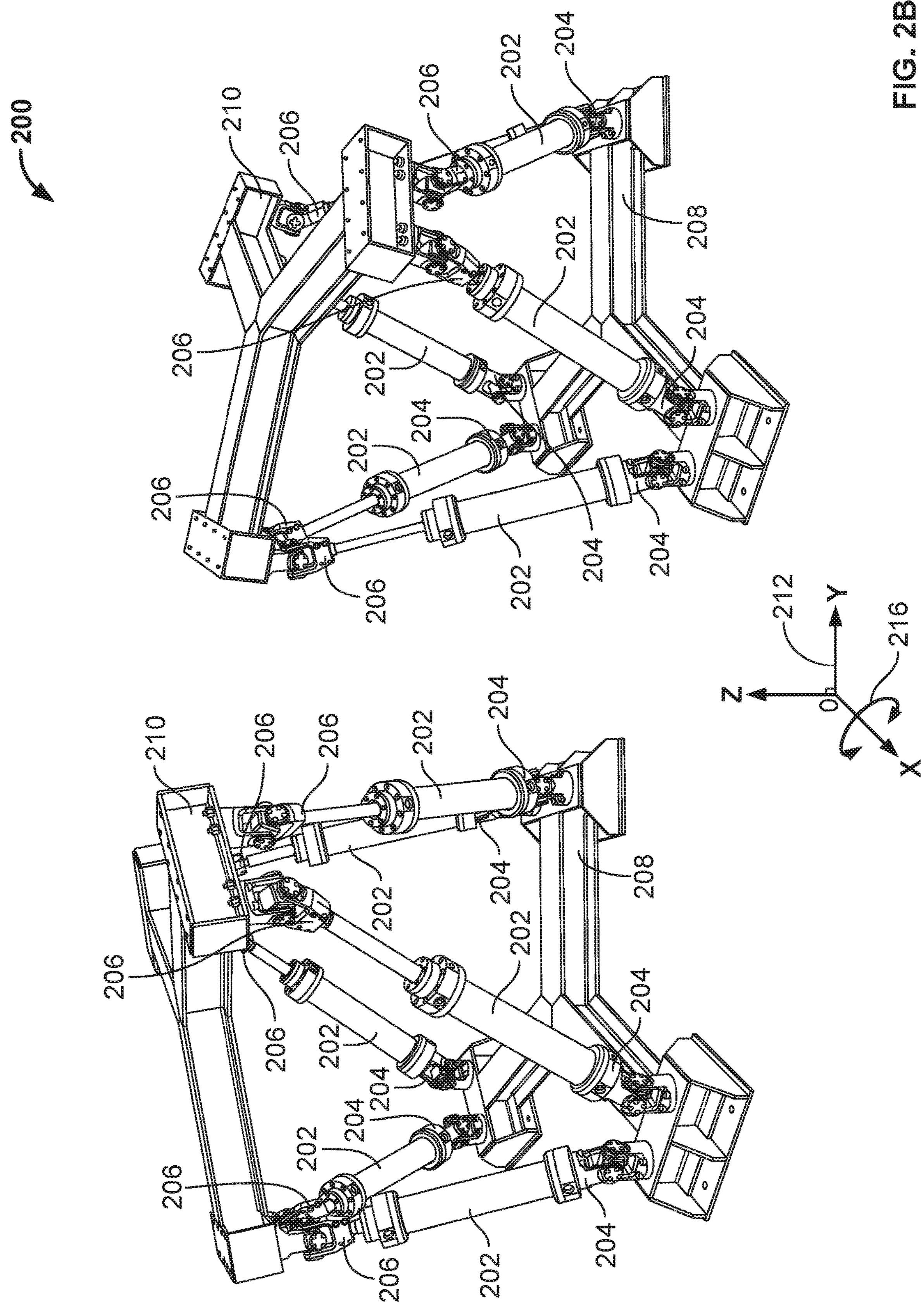
Figure 2C:
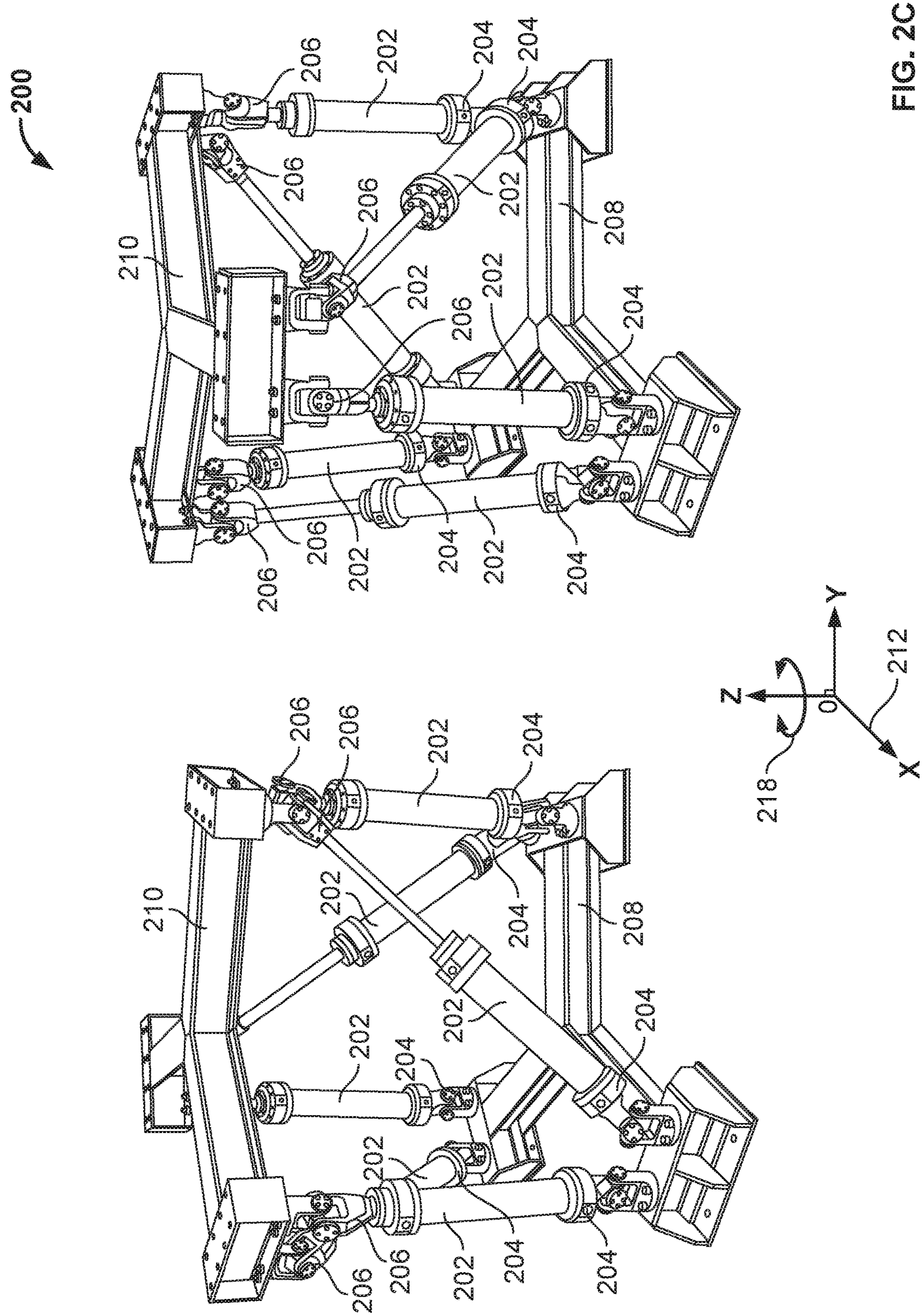
Figure 2D:
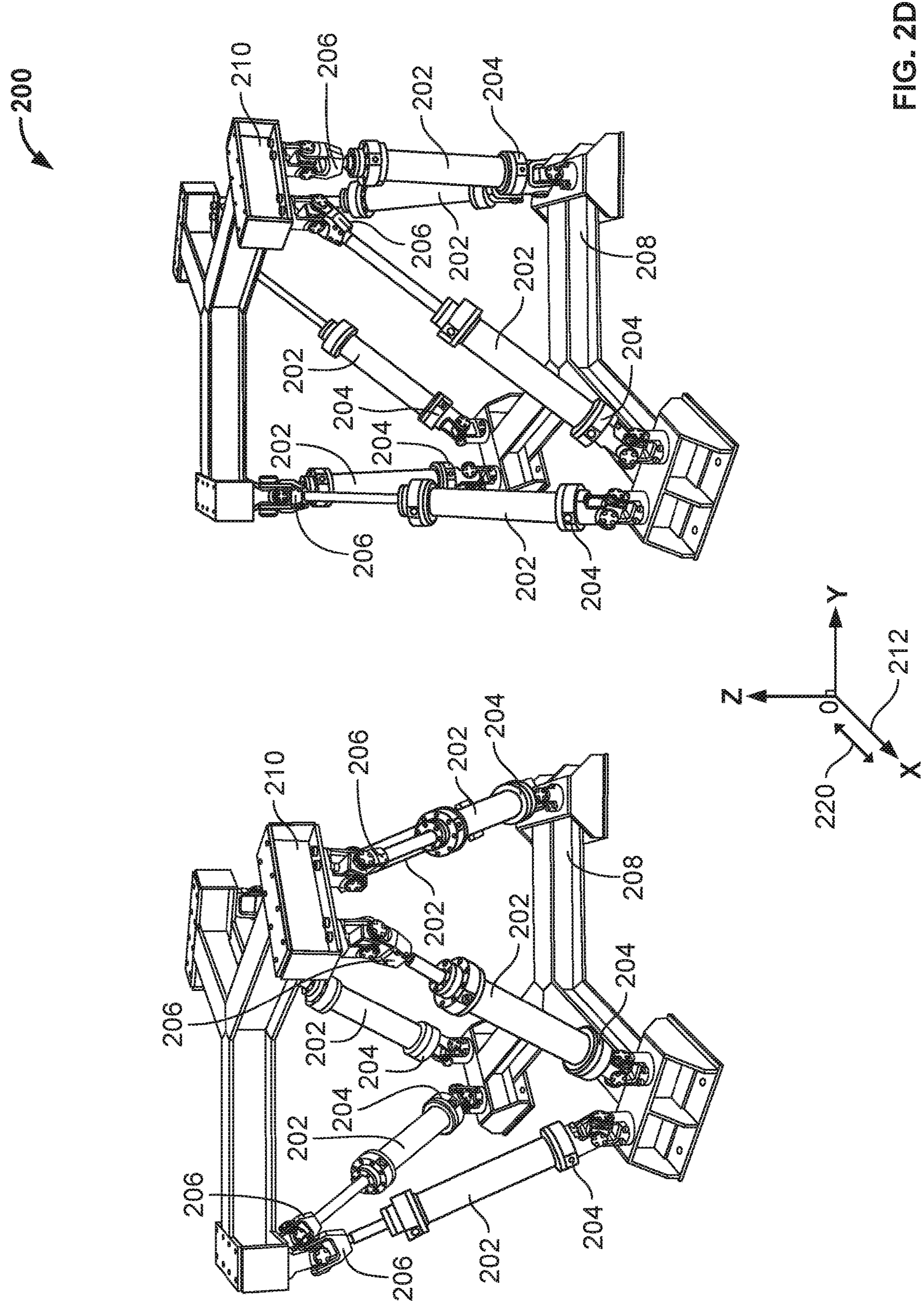
Figure 2E:
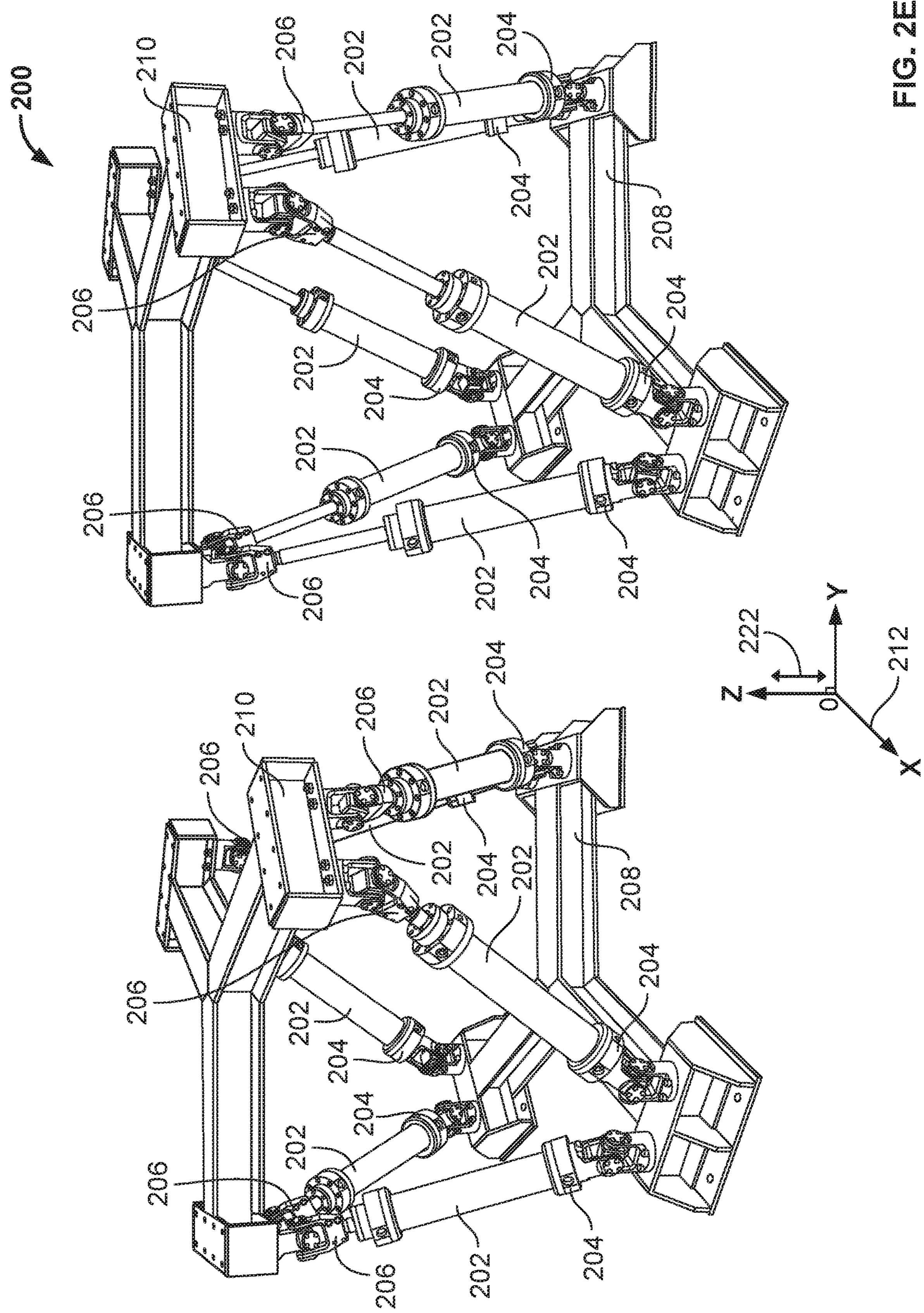
Figure 2F:
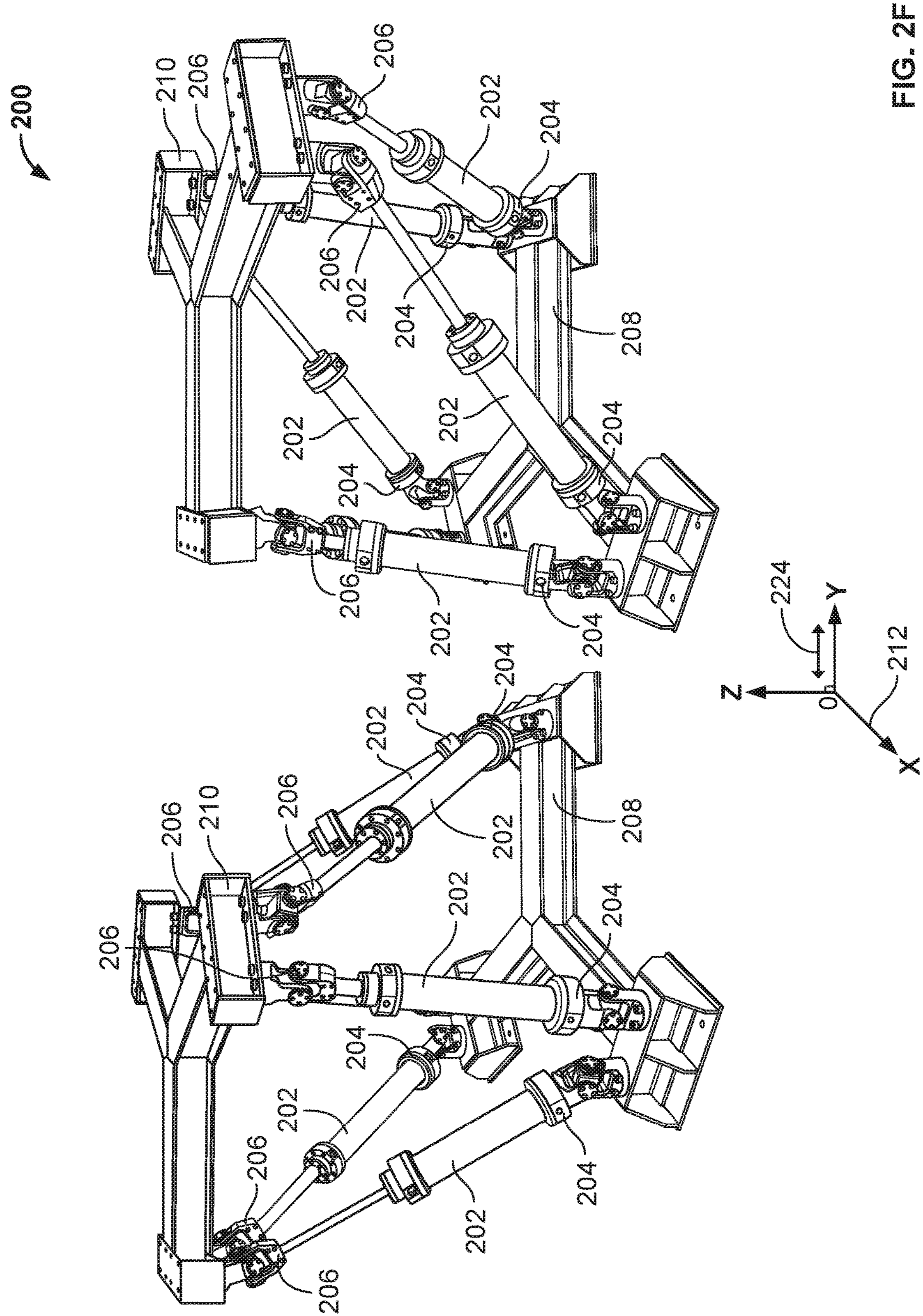

FIG. 2A illustrates the actuators 202 of the Stewart platform 200 moving the upper structure 210 relative to the base structure 208 to simulate a pitch movement 214 of the upper structure 210 about the y-axis of the illustrated three-dimensional Cartesian coordinate system 212. FIG. 2B illustrates the actuators 202 of the Stewart platform 200 moving the upper structure 210 relative to the base structure 208 to simulate a roll movement 216 of the upper structure 210 about the x-axis of the illustrated three-dimensional Cartesian coordinate system 212. FIG. 2C illustrates the actuators 202 of the Stewart platform 200 moving the upper structure 210 relative to the base structure 208 to simulate a yaw movement 218 of the upper structure 210 about the z-axis of the illustrated three-dimensional Cartesian coordinate system 212. FIG. 2D illustrates the actuators 202 of the Stewart platform 200 moving the upper structure 210 relative to the base structure 208 to simulate a surge movement 220 of the upper structure 210 along the x-axis of the illustrated three-dimensional Cartesian coordinate system 212. FIG. 2E illustrates the actuators 202 of the Stewart platform 200 moving the upper structure 210 relative to the base structure 208 to simulate a heave movement 222 of the upper structure 210 along the z-axis of the illustrated three-dimensional Cartesian coordinate system 212. FIG. 2F illustrates the actuators 202 of the Stewart platform 200 moving the upper structure 210 relative to the base structure 208 to simulate a sway movement 224 of the upper structure 210 along the y-axis of the illustrated three-dimensional Cartesian coordinate system 212.

The above-described simulated flight movements of the Stewart platform 200 of FIGS. 2A-2F can be performed and/or implemented via the full-size flight simulator 100 of FIG. 1 described above. The above-described simulated flight movements of the Stewart platform 200 of FIGS. 2A-2F can alternatively be performed and/or implemented via the example motion platforms disclosed herein.

The example motion platforms disclosed herein are structured and/or dimensioned to be of a scale that is miniaturized relative to that of the full-size flight simulator 100 of FIG. 1 described above. The reduced size of the disclosed motion platforms advantageously enables the disclosed motion platforms to be portable. For example, unlike the full-size flight simulator 100 of FIG. 1 described above, the portable motion platforms disclosed herein are advantageously structured and/or dimensioned to be movable through a thirty-six-inch wide by eighty-inch high opening (e.g., the dimensions of a standard doorway). Accordingly, the disclosed portable motion platforms can advantageously be transported and/or relocated from one room and/or area of a facility or environment of use (e.g., a room and/or area of a training center, a research center, a laboratory, an office, a household, etc.) to another without incurring substantial investments in manpower, time, or costs. The portability of the disclosed motion platforms also advantageously enables maintenance of the motion platforms to be performed at effectively any location.

Figure 3:
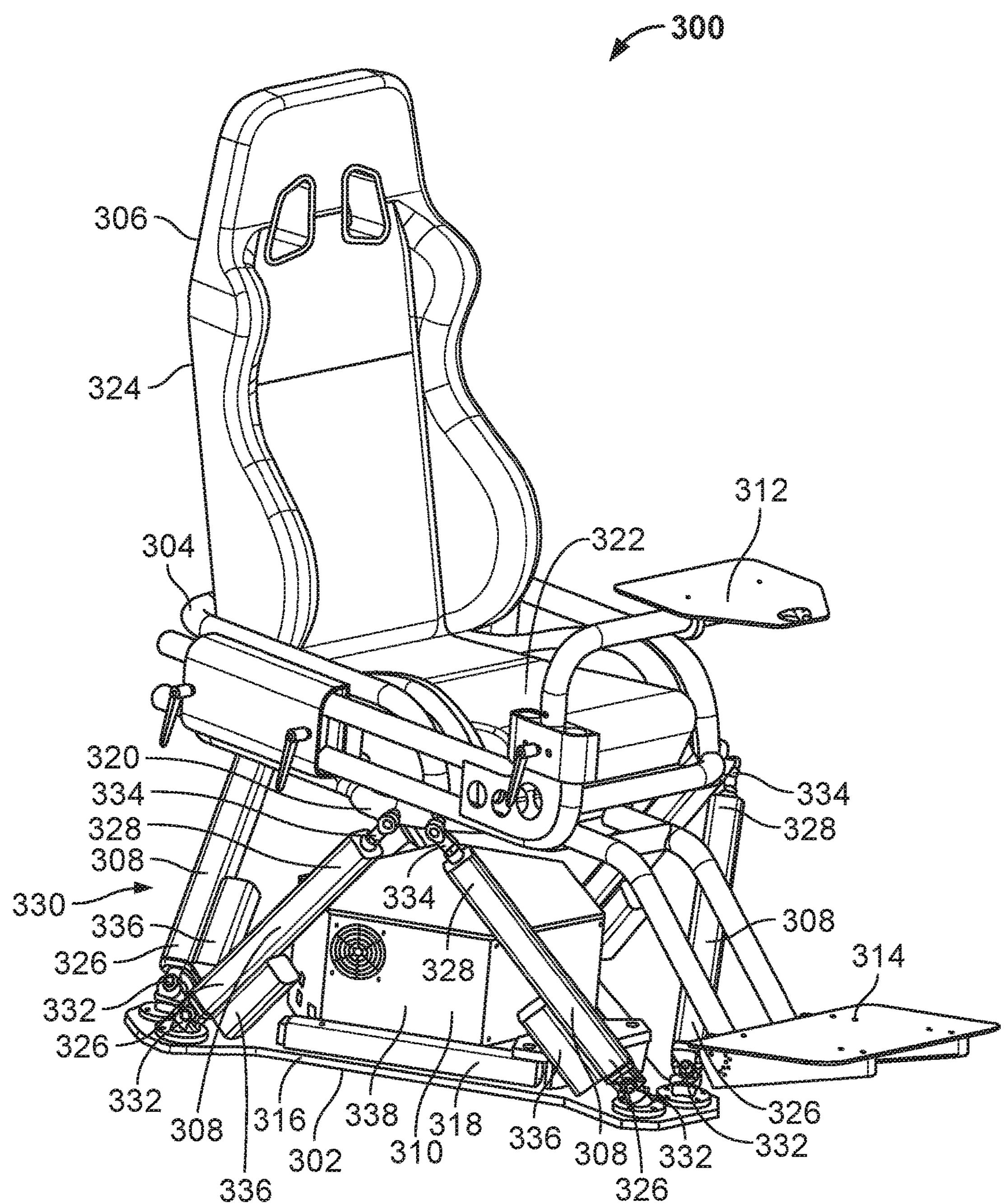
FIG. 3 is a perspective view of an example portable motion platform constructed in accordance with the teachings of this disclosure.
Figure 4:
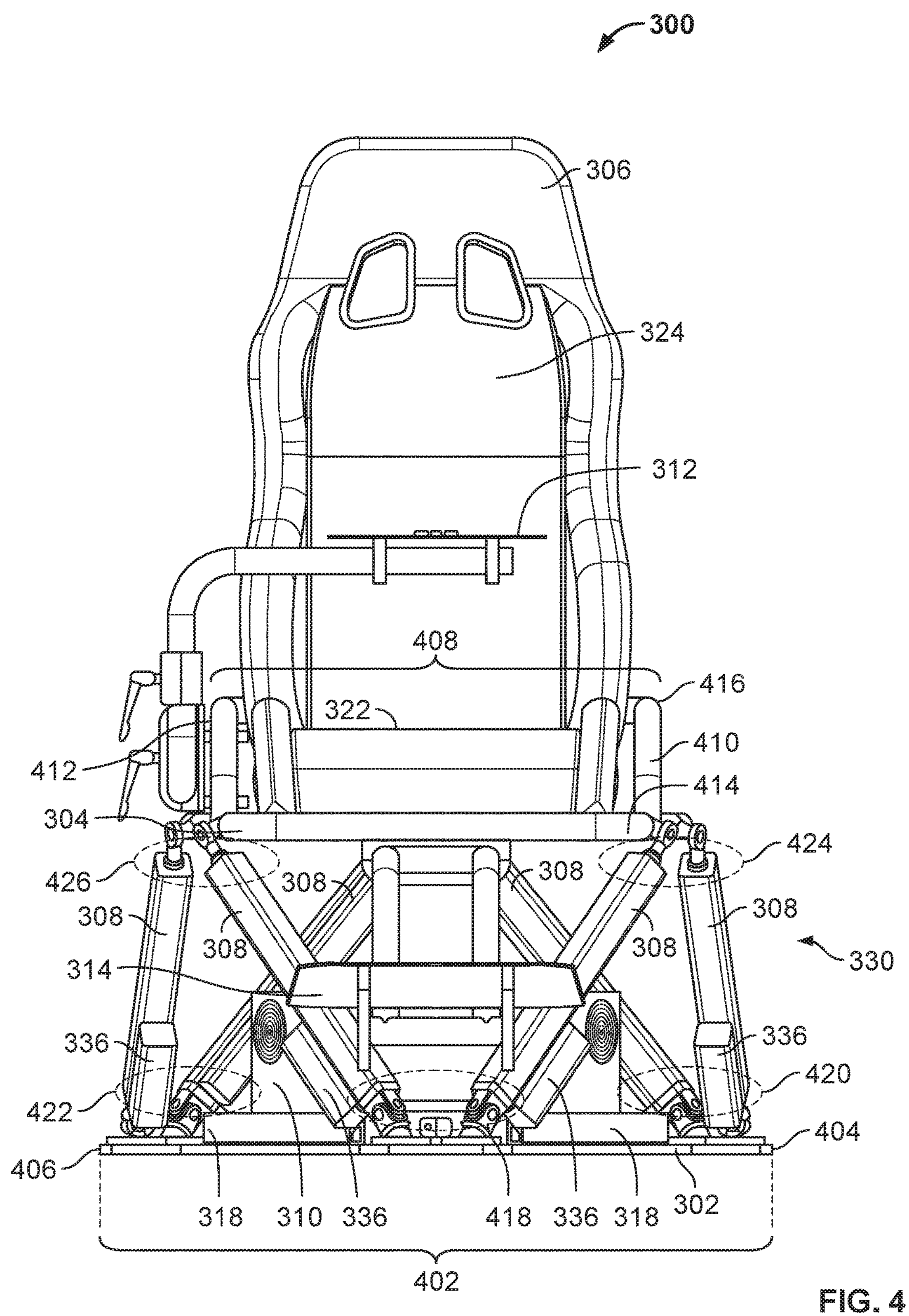
FIG. 4 is a front view of the portable motion platform of FIG. 3.
Figure 5:
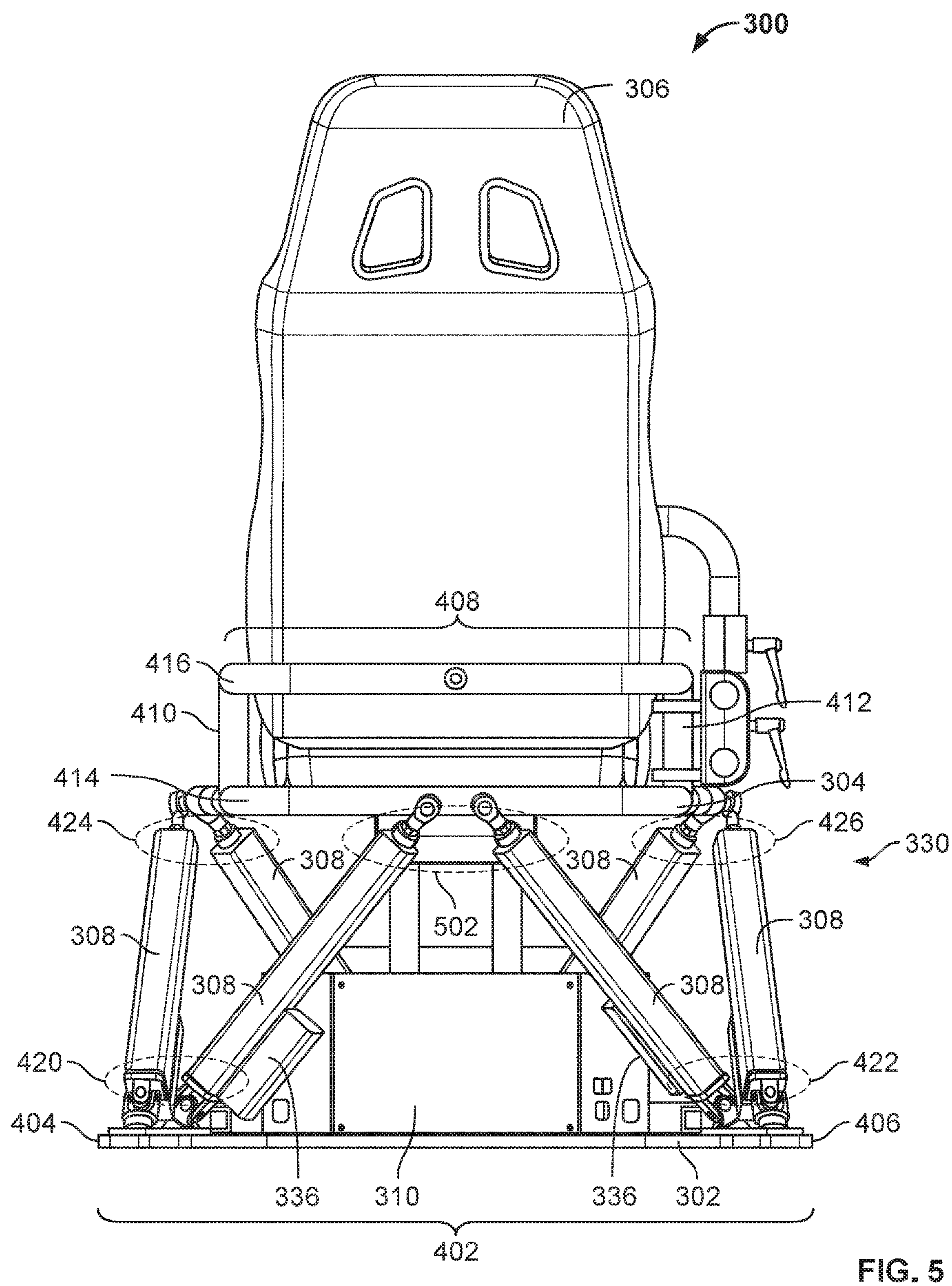
FIG. 5 is a rear view of the portable motion platform of FIGS. 3 and 4.
Figure 6:
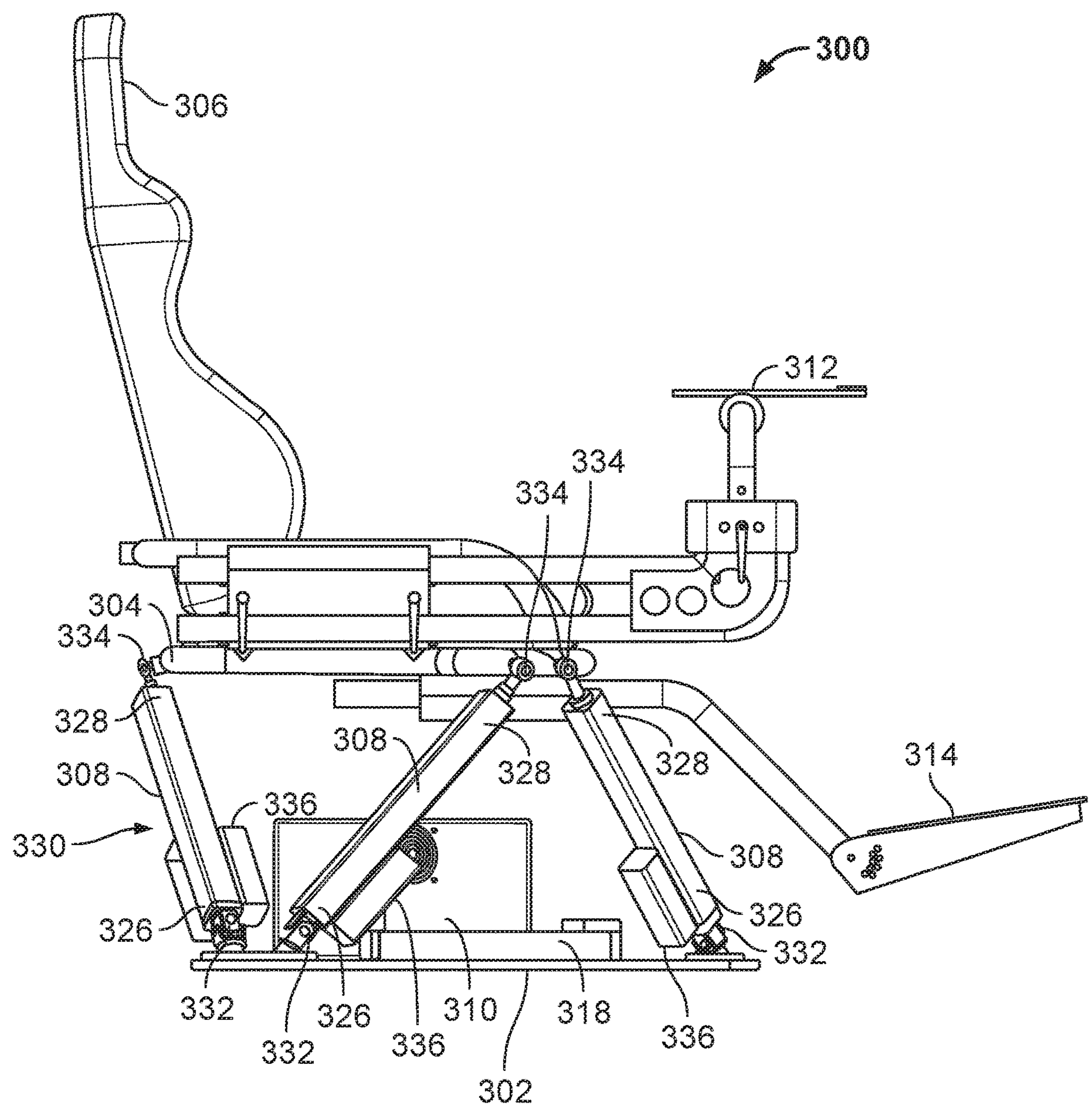
FIG. 6 is a first side view of the portable motion platform of FIGS. 3-5.
Figure 7:
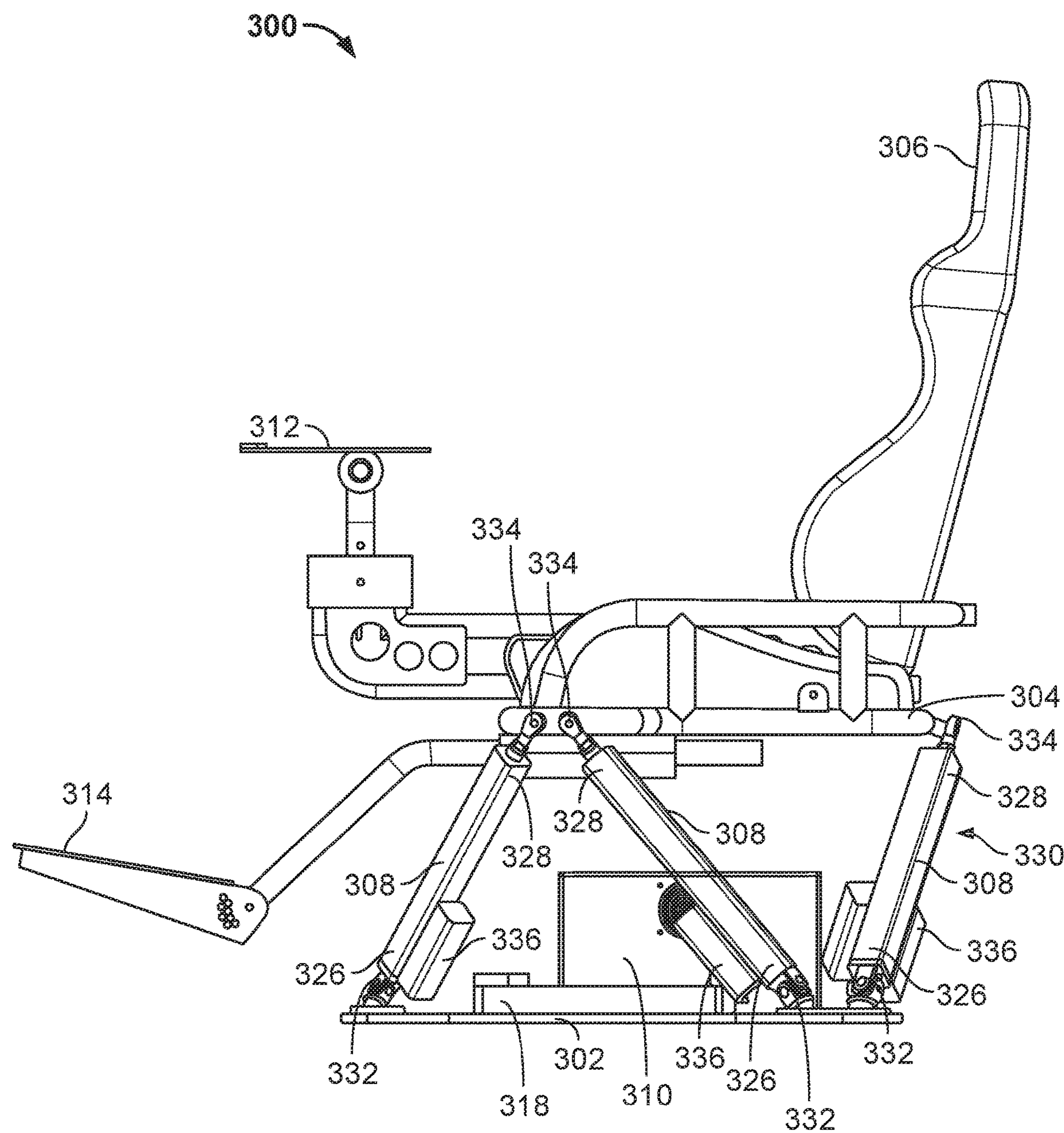
FIG. 7 is a second side view of the portable motion platform of FIGS. 3-6
Figure 8:
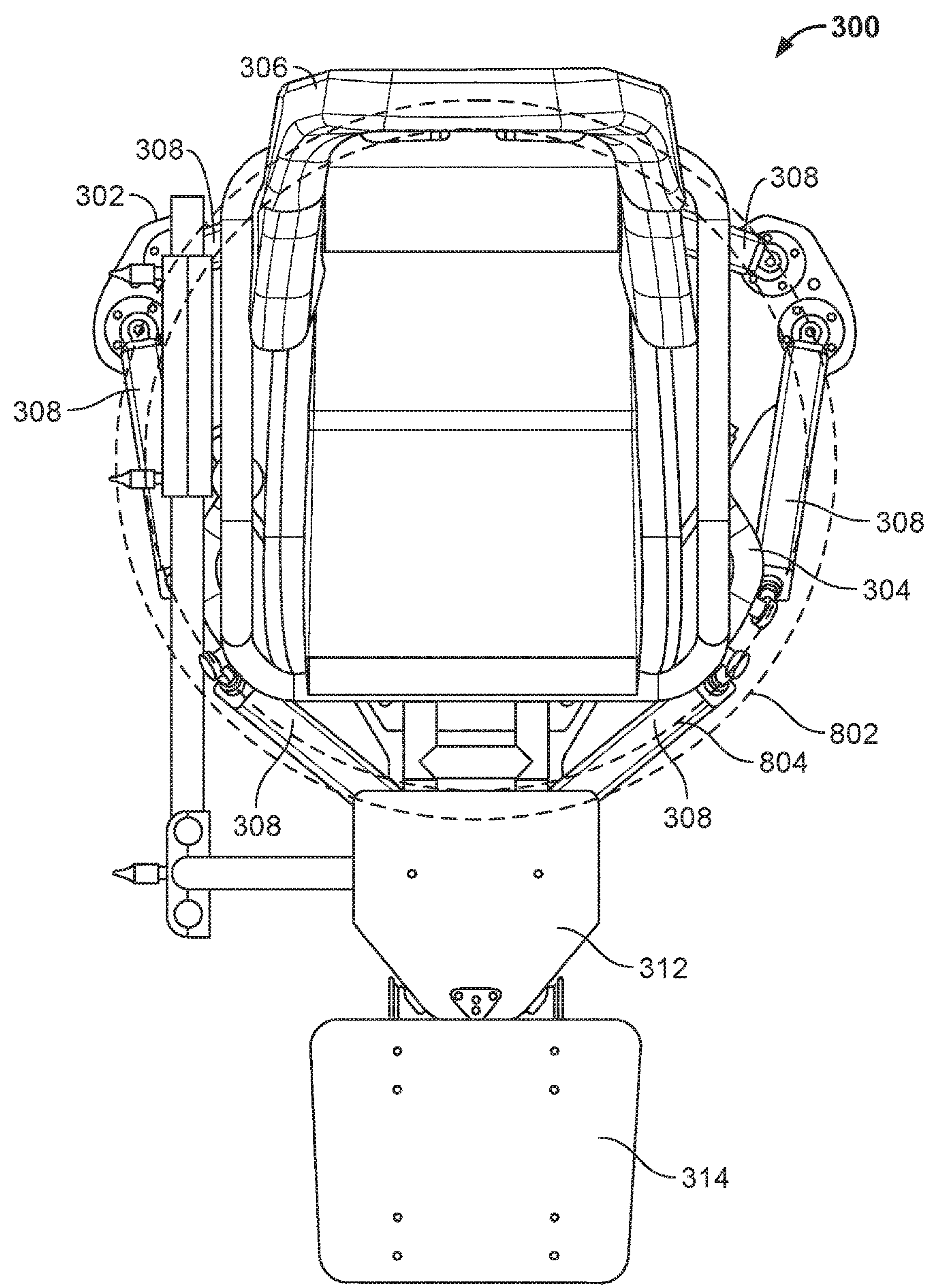
FIG. 8 is a plan view of the portable motion platform of FIGS. 3-7.

FIG. 3 is a perspective view of an example portable motion platform 300 constructed in accordance with the teachings of this disclosure. FIG. 4 is a front view of the portable motion platform 300 of FIG. 3. FIG. 5 is a rear view of the portable motion platform 300 of FIGS. 3 and 4. FIG. 6 is a first side view of the portable motion platform 300 of FIGS. 3-5. FIG. 7 is a second side view of the portable motion platform 300 of FIGS. 3-6. FIG. 8 is a plan view of the portable motion platform 300 of FIGS. 3-7. The portable motion platform 300 of FIGS. 3-8 includes an example base 302, an example seat frame 304, an example seat 306, six example actuators 308, an example control unit 310, an example hand control module 312, and an example foot control module 314.

The base 302 of the portable motion platform 300 of FIGS. 3-8 is sized and/or dimensioned to fit through an opening (e.g., a doorway) that is approximately thirty-six inches wide. For example, the base 302 of FIGS. 3-8 has a first example width 402 that is generally defined by a first example periphery 316 of the base 302. The first width 402 of the base 302 extends from a first example lateral end 404 of the base 302 to a second example lateral end 406 of the base 302. In the illustrated example of FIGS. 3-8, the first width 402 of the base 302 is equal to or less than (e.g., does not exceed) thirty-six inches. For example, the first width 402 of the base 302 of FIGS. 3-8 is approximately 34.5 inches. The above-described sizing and/or dimensioning of the base 302 enables the base 302 and/or, more generally, the portable motion platform 300 to be moved through a thirty-six-inch wide opening such that the portable motion platform 300 can easily be transported and/or relocated from one room and/or area of a facility or environment of use (e.g., a room and/or area of a training center, a research center, a laboratory, an office, a household, etc.) to another.

In the illustrated example of FIGS. 3-8, the base 302 of the portable motion platform 300 has a generally triangular shape that defines the first periphery 316 of the base 302. In other examples, the base 302 can be of a different shape that results in the base 302 having a first width and/or a first periphery that differ(s) from the first width 402 and/or the first periphery 316 of the base 302 shown in FIGS. 3-8. For example, the base 302 of FIGS. 3-8 can alternatively have one of a rectangular shape, a trapezoidal shape, a circular shape, or an elliptical shape.

In the illustrated example of FIGS. 3-8, the portable motion platform 300 further includes example stabilizers 318 that are pivotably coupled to the base 302. Each one of the stabilizers 318 is rotatable between a stowed position (e.g., as shown in FIGS. 3-8) in which the corresponding one of the stabilizers 318 lies within the first periphery 316 of the base 302 of FIGS. 3-8, and a deployed position in which the corresponding one of the stabilizers 318 extends beyond the first periphery 316 of the base 302 of FIGS. 3-8. When positioned in their respective deployed positions, the stabilizers 318 of FIGS. 3-8 can provide additional lateral support to the base 302 of the portable motion platform 300 of FIGS. 3-8 to prevent the portable motion platform 300 as a whole from rocking or tipping relative to an underlying surface (e.g., a floor or ground surface) supporting the base 302 and/or, more generally, the portable motion platform 300.

The seat frame 304 of the portable motion platform 300 of FIGS. 3-8 is also sized and/or dimensioned to fit through an opening (e.g., a doorway) that is approximately thirty-six inches wide. For example, the seat frame 304 of FIGS. 3-8 has a second example width 408 that is generally defined by a second example periphery 320 of the seat frame 304. The second width 408 of the seat frame 304 extends from a first example lateral end 410 of the seat frame 304 to a second example lateral end 412 of the seat frame 304. In the illustrated example of FIGS. 3-8, the second width 408 of the seat frame 304 is equal to or less than (e.g., does not exceed) thirty-six inches. For example, the second width 408 of the seat frame 304 of FIGS. 3-8 is approximately 26.0 inches. The above-described sizing and/or dimensioning of the seat frame 304 enables the seat frame 304 and/or, more generally, the portable motion platform 300 to be moved through a thirty-six-inch wide opening such that the portable motion platform 300 can easily be transported and/or relocated from one room and/or area of a facility or environment of use (e.g., a room and/or area of a training center, a research center, a laboratory, an office, a household, etc.) to another.

The seat frame 304 of the portable motion platform 300 of FIGS. 3-8 is configured to support the seat 306 of the portable motion platform 300. In the illustrated example of FIGS. 3-8, the seat frame 304 includes an example seat base support portion 414, and further includes an example seat back support portion 416 coupled to and extending upwardly from the seat base support portion 414. The seat base support portion 414 is shaped and/or configured to support an example seat base 322 of the seat 306, and the seat back support portion 416 is shaped and/or configured to support an example seat back 324 of the seat 306. In other examples, the seat frame 304 can include only the seat base support portion 414 without further including the seat back support portion 416. In examples where the seat frame 304 includes both the seat base support portion 414 and the seat back support portion 416, the second width 408 of the seat frame 304 described above is the greater one of a width of the seat base support portion 414 and a width of the seat back support portion 416.

In the illustrated example of FIGS. 3-8, the seat base support portion 414 of the seat frame 304 has a generally rectangular shape that defines the second periphery 320 of the seat frame 304. In other examples, the seat base support portion 414 of the seat frame 304 can be of a different shape that results in the seat frame 304 having a second width and/or a second periphery that differ(s) from the second width 408 and/or the second periphery 320 of the seat frame 304 show in FIGS. 3-8. For example, the seat base support portion 414 of the seat frame 304 of FIGS. 3-8 can alternatively have one of a triangular shape, a trapezoidal shape, a circular shape, or an elliptical shape.

The seat 306 of the portable motion platform 300 of FIGS. 3-8 provides a seating surface for a user (e.g., a human) of the portable motion platform 300. As described above, the seat 306 of FIGS. 3-8 is supported by the seat frame 304. More specifically, the seat base 322 of the seat 306 is supported by the seat base support portion 414 of the seat frame 304, and the seat back 324 of seat 306 is supported by the seat back support portion 416 of the seat frame 304. In some examples, the seat 306 has a width that is less than the second width 408 of the seat frame 304. In other examples, the width of the seat 306 can be equal to or greater than the second width 408 of the seat frame 304. In such other examples, the width of the seat 306 is equal to or less than (e.g., does not exceed) thirty-six inches such that the portable motion platform 300 as a whole remains easily transportable and/or relocatable from one room and/or area of a facility or environment of use (e.g., a room and/or area of a training center, a research center, a laboratory, an office, a household, etc.) to another.

Each one of the actuators 308 of FIGS. 3-8 has a corresponding first end 326 and a corresponding second end 328 located opposite the first end 326. Each one of the actuators 308 of FIGS. 3-8 is coupled at its corresponding first end 326 to the base 302 of the portable motion platform 300, and is coupled at its corresponding second end 328 to the seat frame 304 (e.g., to a periphery of the seat base support portion 414 of the seat frame 304) of the portable motion platform 300. The actuators 308 of the portable motion platform 300 of FIGS. 3-8 are arranged in an example Stewart platform configuration 330 that enables the actuators 308 to move the seat frame 304 of the portable motion platform 300 relative to the base 302 of the portable motion platform 300 with six degrees of freedom, where each degree of freedom corresponds to one of six simulated flight movements including a pitch movement, a roll movement, a yaw movement, a surge movement, a heave movement, and a sway movement.

In connection with the Stewart platform configuration 330 of FIGS. 3-8, the six actuators 308 of the portable motion platform 300 are attached in pairs (e.g., a first example pair 418, a second example pair 420, and a third example pair 422) at their corresponding first ends 326 to the base 302 of portable motion platform 300. More specifically, each one of the actuators 308 is coupled to the base 302 of the portable motion platform 300 via a corresponding first example universal joint 332 mounted on the base 302 and coupled to the first end 326 of the corresponding one of the actuators 308. In the illustrated example of FIGS. 3-8, the distance between neighboring ones of the first ends 326 of the actuators 308 within each one of the first, second and third pairs 418, 420, 422 is between four to five inches on center. In a particular example, the distance between neighboring ones of the first ends 326 of the actuators 308 within each one of the first, second and third pairs 418, 420, 422 is approximately 4.6 inches on center.

In further connection with the Stewart platform configuration 330 of FIGS. 3-8, the six actuators 308 of the portable motion platform 300 are attached in different pairs (e.g., a fourth example pair 424, a fifth example pair 426, and a sixth example pair 502) at their corresponding second ends 328 to the seat frame 304 (e.g., to a periphery of the seat base support portion 414 of the seat frame 304) of the portable motion platform 300. More specifically, each one of the actuators 308 is coupled to the seat frame 304 of the portable motion platform 300 via a corresponding second example universal joint 334 mounted on the seat frame 304 and coupled to the second end 328 of the corresponding one of the actuators 308. In the illustrated example of FIGS. 3-8, the distance between neighboring ones of the second ends 328 of the actuators 308 within each one of the fourth, fifth and sixth pairs 424, 426, 502 is between two and three inches on center. In a particular example, the distance between neighboring ones of the second ends 328 of the actuators 308 within each one of the fourth, fifth and sixth pairs 424, 426, 502 is approximately 2.3 inches on center.

The locations at which the first ends 326 of the actuators 308 of FIGS. 3-8 are respectively coupled to the base 302 of the portable motion platform 300 of FIGS. 3-8 define a first example circumference 802. Similarly, the locations at which the second ends 328 of the actuators 308 of FIGS. 3-8 are respectively coupled to the seat frame 304 of the portable motion platform 300 of FIGS. 3-8 define a second example circumference 804. In some examples, the second circumference 804 is less than the first circumference 802. In some such examples, the second circumference 804 is less than ninety percent (90%) of the first circumference 802. For example, the first circumference 802 defined by the first ends 326 of the actuators 308 of FIGS. 3-8 is approximately 103.6 inches, and the second circumference 804 defined by the second ends 328 of the actuators 308 of FIGS. 3-8 is approximately 91.1 inches, thereby resulting in the second circumference 804 being approximately 87.9% of the first circumference 802.

Each one of the six actuators 308 of the portable motion platform 300 of FIGS. 3-8 is an electro-mechanical linear actuator having a variable length that can be adjusted (e.g., increased in length or decreased in length) via a corresponding one of six example servo motors 336 that is mounted to and/or integrally formed with the corresponding one of the actuators 308. Each one of the servo motors 336 of FIGS. 3-8 is operatively coupled to its corresponding one of the actuators 308 of FIGS. 3-8, and is also operatively coupled to the control unit 310 of FIGS. 3-8. The corresponding length of each one of the actuators 308 can be varied by its corresponding one of the servo motors 336 between a retracted length (e.g., a minimum length) and an expanded length (e.g., a maximum length) in response to one or more electrical control signals received at the corresponding one of the servo motors 336 from the control unit 310 of the portable motion platform 300, as further described below. The difference between the retracted length and the expanded length of the corresponding one of the actuators 308 defines a maximum stroke length of the corresponding one of the actuators 308. In some examples, each one of the actuators 308 has a maximum stroke length of twelve inches or less. For example, each one of the actuators 308 of FIGS. 3-8 has a maximum stroke length of approximately 7.9 inches.

When the corresponding length of each one of the actuators 308 of the portable motion platform 300 is at a fully-retracted and/or minimum length (e.g., as shown in FIGS. 3-8), each one of the actuators 308 is positioned relative to the base 302 of the portable motion platform 300 at an angle of approximately 51.5 degrees, each one of the actuators 308 is positioned relative to the seat frame 304 of the portable motion platform 300 at an angle of approximately 51.5 degrees, the distance between the base 302 of the portable motion platform 300 and the seat frame 304 of the portable motion platform is approximately 13.3 inches, and the height of the portable motion platform 300 as a whole (e.g., including the seat 306) is approximately 51.1 inches. The above-described sizing and/or dimensioning of the portable motion platform 300 enables the portable motion platform 300 to be moved through a thirty-six-inch wide by eighty-inch high opening (e.g., the dimensions of a standard doorway) such that the portable motion platform 300 can easily be transported and/or relocated from one room and/or area of a facility or environment of use (e.g., a room and/or area of a training center, a research center, a laboratory, an office, a household, etc.) to another.

The control unit 310 of the portable motion platform 300 of FIGS. 3-8 is operatively coupled to each one of the servo motors 336 of the portable motion platform 300, as further described below. In the illustrated example of FIGS. 3-8, the control unit 310 is mounted to the base 302 of the portable motion platform 300. The control unit 310 has a third example periphery 338 located and/or contained within the first periphery 316 of the base 302. In some examples, the control unit 310 of FIGS. 3-8 is configured to be powered by a conventional household power supply (e.g., a wall outlet configured to receive a plug). For example, the control unit 310 of FIGS. 3-8 can be configured to be powered by a one-hundred-twenty volt electric power supply operating at sixty hertz. As another example, the control unit 310 of FIGS. 3-8 can alternatively be configured to be powered by a two-hundred-thirty volt electric power supply operating at fifty hertz. In such examples, the portable motion platform 300 of FIGS. 3-8 can include an electrical cord having a first end that is operatively coupled to the control unit 310, and a second end (e.g., opposite the first end) that is operatively coupled to an electrical plug structured to be inserted into a wall outlet.

Figure 9:
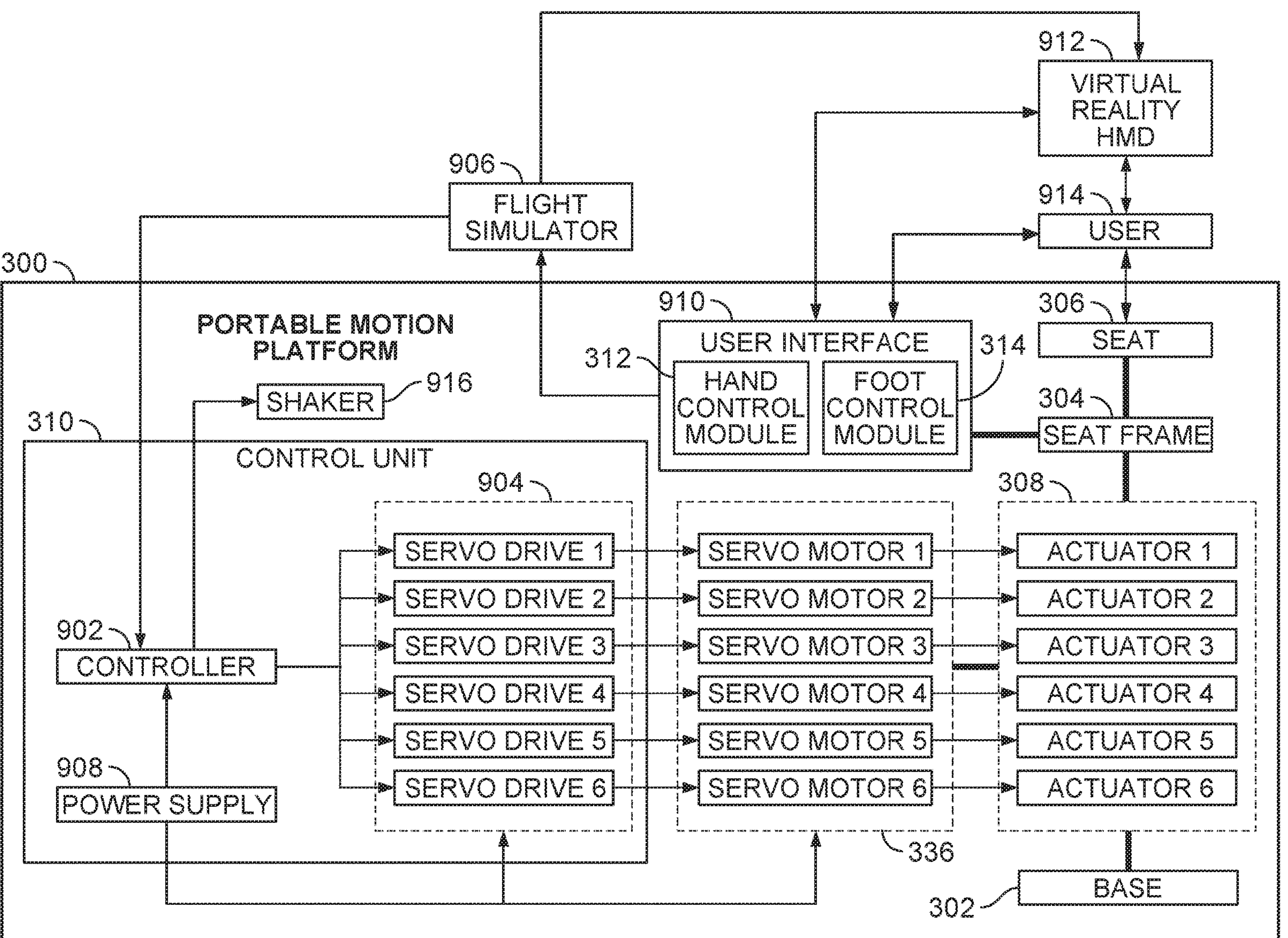
FIG. 9 is a block diagram of the portable motion platform of FIGS. 3-8.

FIG. 9 is a block diagram of the portable motion platform 300 of FIGS. 3-8. The control unit 310 of the portable motion platform 300 of FIGS. 3-9 includes a controller 902 (e.g., one or more programmable logic controller(s)) and six example servo drives 904 that are collectively configured to control actuation of the servo motors 336 and/or the actuators 308 of the portable motion platform 300 of FIGS. 3-9. The controller 902 of the control unit 310 is operatively coupled to each one of the servo drives 904 of the control unit 310 of FIGS. 3-9, and each one of the servo drives 904 of the control unit 310 is operatively coupled to a corresponding one of the servo motors 336 associated with a corresponding one of the actuators 308 of FIGS. 3-9. The controller 902 of the control unit 310 is also operatively coupled to an example flight simulator 906. In some examples, the control unit 310 of FIGS. 3-9 can further include an example power supply 908 configured to receive power from an external power source, and/or configured to supply power to one or more electrical component(s) of the control unit 310 (e.g., the controller 902, the servo drives 904, etc.) and/or of the portable motion platform 300 generally (e.g., the servo motors 336, the flight simulator 906, an example user interface 910 including the hand control module 312 and/or the foot control module 314, an example head-mounted or helmet-mounted virtual reality display 912, etc.).

The controller 902, the servo drives 904 and/or, more generally, the control unit 310 of FIGS. 3-9 control(s) the actuation of the servo motors 336 and/or the actuators 308 of FIGS. 3-9 based on one or more first control signal(s) received at the controller 902 and/or the control unit 310 from the flight simulator 906 of FIGS. 3-9. For example, in response to the first control signal(s) received at the controller 902 and/or the control unit 310 of FIGS. 3-9 from the flight simulator 906 of FIGS. 3-9, the controller 902 transmits and/or sends one or more second control signal(s) to each one of the servo drives 904 of the control unit 310 of FIGS. 3-9. In response to the second control signal(s) received from the controller 902, each one of the servo drives 904 of the control unit 310 of FIGS. 3-9 transmits and/or sends one or more third control signal(s) to its corresponding one of the servo motors 336 associated with a corresponding one of the actuators 308. In response to the third control signal(s) received from a corresponding one of the servo drives 904, each one of the servo motors 336 is actuated to adjust (e.g., increase or decrease) the corresponding length of the associated one of the actuators 308 of the portable motion platform 300 of FIGS. 3-9.

The hand control module 312 of the portable motion platform 300 of FIGS. 3-9 supports and/or includes one or more input device(s) configured to be maneuvered, positioned and/or operated by the hands of an example user 914 (e.g. a human) of the portable motion platform 300 seated in the seat 306 of the portable motion platform 300. For example, the hand control module 312 can support and/or include a first input device structured to simulate a control yoke of an aircraft, and/or a second input device structured to simulate a throttle lever of the aircraft. The input device(s) of the hand control module 312 can be configured and/or structured to simulate the hand controls of a particular type of aircraft (e.g., a specific type of airplane, a specific type of helicopter, etc.). The hand control module 312 of the portable motion platform 300 of FIGS. 3-9 is operatively couplable to the flight simulator 906, which in turn is operatively couplable to the control unit 310 of the portable motion platform 300.

When the hand control module 312 of FIGS. 3-9 is operatively coupled to the flight simulator 906 of FIGS. 3-9, the flight simulator 906 is able to receive one or more fourth control signal(s) corresponding to movements, maneuvers and/or relative positions of the hand control module 312 and/or the associated input device(s) thereof. Thus, when the hand control module 312 is operatively coupled to the flight simulator 906, and the flight simulator 906 is operatively coupled to the control unit 310 of the portable motion platform 300, the above-described first control signal(s) that are received at the controller 902 and/or the control unit 310 from the flight simulator 906 can be based on the fourth control signal(s) received at the flight simulator 906 from the hand control module 312.

The hand control module 312 of FIGS. 3-9 is removably couplable to and/or from the seat frame 304 of FIGS. 3-8 such that the hand control module 312 can selectively be attached to or removed from the seat frame 304 and/or, more generally, be attached to or removed from the portable motion platform 300 as a whole. The hand control module 312 can be attached to any portion of the seat frame 304 of the portable motion platform 300. For example, while the hand control module 312 of FIGS. 3-9 is shown attached to a right side of the seat frame 304, the hand control module 312 can alternatively be attached to the left side of the seat frame 304, to a middle portion of the seat frame 304, and/or to any other predetermined location on or along the seat frame 304. In some examples, it can be desirable and/or necessary to remove the hand control module 312 of FIGS. 3-9 from the seat frame 304 of FIGS. 3-9 to facilitate moving and/or transporting the portable motion platform 300 of FIGS. 3-9 from one room and/or area of a facility or environment of use (e.g., a room and/or area of a training center, a research center, a laboratory, an office, a household, etc.) to another. In other examples, it can be desirable and/or necessary to remove the hand control module 312 of FIGS. 3-9 from the seat frame 304 of FIGS. 3-9 to facilitate replacing a first type of the hand control module 312 having or supporting one or more associated first input device(s) with a second type of the hand control module 312 having or supporting one or more associated second input device(s) that differ from the first input device(s).

The foot control module 314 of the portable motion platform 300 of FIGS. 3-8 supports and/or includes one or more input device(s) configured to be maneuvered, positioned and/or operated by the feet of the user 914 (e.g. a human) of the portable motion platform 300 seated in the seat 306 of the portable motion platform 300. For example, the foot control module 314 can support and/or include a first input device structured to simulate a first rudder pedal of an aircraft, and can further support and/or include a second input device structured to simulate a second rudder pedal of the aircraft. The input device(s) of the foot control module 314 can be configured and/or structured to simulate the foot controls of a particular type of aircraft (e.g., a specific type of airplane, a specific type of helicopter, etc.). The foot control module 314 of the portable motion platform 300 of FIGS. 3-9 is operatively couplable to the flight simulator 906, which in turn is operatively couplable to the control unit 310 of the portable motion platform 300.

When the foot control module 314 of FIGS. 3-9 is operatively coupled to the flight simulator 906 of FIGS. 3-9, the flight simulator 906 is able to receive one or more fifth control signal(s) corresponding to movements, maneuvers and/or relative positions of the foot control module 314 and/or the associated input device(s) thereof. Thus, when the foot control module 314 is operatively coupled to the flight simulator 906, and the flight simulator 906 is operatively coupled to the control unit 310 of the portable motion platform 300, the above-described first control signal(s) that are received at the controller 902 and/or the control unit 310 from the flight simulator 906 can be based on the fifth control signal(s) received at the flight simulator 906 from the foot control module 314.

The foot control module 314 of FIGS. 3-9 is removably couplable to and/or from the seat frame 304 of FIGS. 3-9 such that the foot control module 314 can selectively be attached to or removed from the seat frame 304 and/or, more generally, be attached to or removed from the portable motion platform 300 as a whole. The foot control module 314 can be attached to any portion of the seat frame 304 of the portable motion platform 300. For example, while the foot control module 314 of FIGS. 3-9 is shown attached to a middle portion of the seat frame 304, the foot control module 314 can alternatively be attached to the left side of the seat frame 304, to the right side of the seat frame 304, and/or to any other predetermined location on or along the seat frame 304. In some examples, it can be desirable and/or necessary to remove the foot control module 314 of FIGS. 3-9 from the seat frame 304 of FIGS. 3-9 to facilitate moving and/or transporting the portable motion platform 300 of FIGS. 3-9 from one room and/or area of a facility or environment of use (e.g., a room and/or area of a training center, a research center, a laboratory, an office, a household, etc.) to another. In other examples, it can be desirable and/or necessary to remove the foot control module 314 of FIGS. 3-9 from the seat frame 304 of FIGS. 3-9 to facilitate replacing a first type of the foot control module 314 having or supporting one or more associated first input device(s) with a second type of the foot control module 314 having or supporting one or more associated second input device(s) that differ from the first input device(s).

In some examples, the portable motion platform 300 of FIGS. 3-9 can further include an example shaker 916 (e.g., an electric motor coupled to an unbalanced flywheel). The shaker 916 of the portable motion platform 300 can be operatively coupled to the controller 902 of the control unit 310. The controller 902 of the control unit 310 can command the shaker 916 (e.g., via one or more electrical signal(s) transmitted from the controller 902 to the shaker 916) to selectively produce a rumble effect or haptic sensation. The rumble effect or haptic sensation produced by the shaker 916 can be translated to the seat 306, the hand control module 312, and/or the foot control module 314 of the portable motion platform 300 such that the rumble effect or haptic sensation can be experienced by the user 914 (e.g., felt in the hands, the feet, and/or the body of the user 914) of the portable motion platform 300. The shaker 916 can be mounted to any of the base 302, the seat frame 304, the seat 306, the actuators 308, the control unit 310, the hand control module 312, and/or the foot control module 314 of the portable motion platform 300 of FIGS. 3-9.

Figure 10:
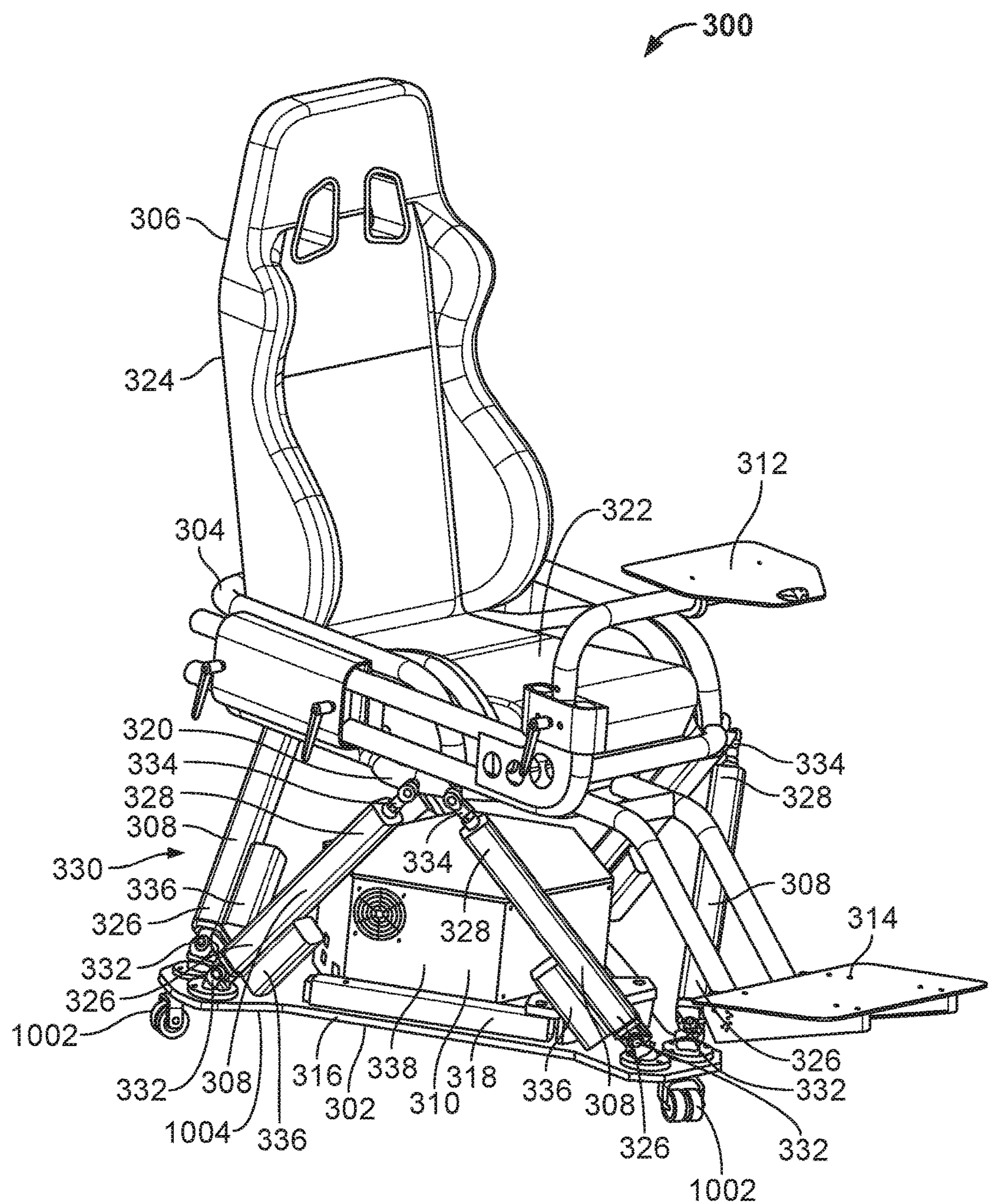
FIG. 10 is a perspective view of the portable motion platform of FIGS. 3-9 further including example detachable wheels.

The above-described portability of the portable motion platform 300 of FIGS. 3-9 can be enhanced by implementing detachable wheels. For example, FIG. 10 is a perspective view of the portable motion platform of FIGS. 3-9 further including example detachable wheels 1002. In the illustrated example of FIG. 10, the detachable wheels 1002 are selectively couplable to an example underside of the base 302 of the portable motion platform 300. When the detachable wheels 1002 are coupled to the base 302 of the portable motion platform 300 as shown in FIG. 10, the base 302 is supported by the detachable wheels 1002, and the height of the portable motion platform 300 as a whole (e.g., including the seat 306) accordingly increases from approximately 51.1 inches (as described above in connection with FIGS. 3-8) to 54.5 inches. When the detachable wheels 1002 are coupled and/or attached to the base 302 of the portable motion platform 300, the detachable wheels 1002 facilitate movement of the base 302 and/or, more generally, of the portable motion platform 300, relative to an underlying surface (e.g., a floor or ground surface).

The detachable wheels 1002 of FIG. 10 include a release mechanism structured to facilitate releasing and/or detaching the detachable wheels 1002 from the base 302 of the portable motion platform 300. In some examples, the detachable wheels 1002 are to be detached from the base 302 of the portable motion platform 300 prior to the portable motion platform 300 being put into use. The detachable wheels 1002 of FIG. 10 can further include a locking mechanism structured to prevent rotation of the detachable wheels 1002. In some examples, the detachable wheels 1002 are to be locked (e.g., such that the detachable wheels 1002 can no longer rotate) prior to the portable motion platform 300 being put into use.

The compact footprint of the portable motion platform 300 of FIGS. 3-10 enables the portable motion platform 300 to be moved through narrow openings and/or passages (e.g., through a doorway having standard dimensions). For example, the portable motion platform 300 can be moved through an opening located between a first area and a second area, with the opening having a width not exceeding thirty-six inches. In such an example, the first width 402 of the base 302 of the portable motion platform 300 and the second width 408 of the seat frame 304 are respectively less than the width of the opening. In some examples, the detachable wheels 1002 are attached to the base 302 of the portable motion platform 300 prior to moving the portable motion platform 300 through the opening. In some examples, the detachable wheels 1002 are detached from the base 302 of the portable motion platform 300 subsequent to moving the portable motion platform 300 through the opening. In some examples, moving the portable motion platform 300 through the opening includes sliding (e.g., pushing, pulling, rolling, etc.) the portable motion platform 300 along an underlying surface extending through the opening. In some examples, the detachable wheels 1002 support the base 302 of the portable motion platform 300 and are in contact with the underlying surface during the sliding.

In some examples, the hand control module 312 is detached from the seat frame 304 of the portable motion platform 300 prior to moving the portable motion platform 300 through the opening. In some examples, the hand control module 312 (e.g., a first hand control module) or a second hand control module is attached to the seat frame 304 subsequent to moving the portable motion platform 300 through the opening. In some examples, the second hand control module is different from the hand control module 312.

In some examples, the foot control module 314 is detached from the seat frame 304 of the portable motion platform 300 prior to moving the portable motion platform 300 through the opening. In some examples, the foot control module 314 (e.g., a first foot control module) or a second foot control module is attached to the seat frame 304 subsequent to moving the portable motion platform 300 through the opening. In some examples, the second foot control module is different from the foot control module 314.

From the foregoing, it will be appreciated that the disclosed motion platforms are structured and/or dimensioned to be of a scale that is miniaturized relative to that of the full-size flight simulator 100 of FIG. 1 described above. The reduced size of the disclosed motion platforms advantageously enables the disclosed motion platforms to be portable. For example, unlike the full-size flight simulator 100 of FIG. 1 described above, the portable motion platforms disclosed herein are advantageously structured and/or dimensioned to be movable through a thirty-six-inch wide by eighty-inch high opening (e.g., the dimensions of a standard doorway). Accordingly, the disclosed portable motion platforms can advantageously be transported and/or relocated from one room and/or area of a facility or environment of use (e.g., a room and/or area of a training center, a research center, a laboratory, an office, a household, etc.) to another without incurring substantial investments in manpower, time, or costs. The portability of the disclosed motion platforms also advantageously enables maintenance of the motion platforms to be performed at effectively any location.

In some examples, a portable motion platform apparatus is disclosed. In some disclosed examples, the portable motion platform apparatus comprises a base, a seat frame, and six actuators. In some disclosed examples, the seat frame is configured to support a seat. In some disclosed examples the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame.

In some disclosed examples, the base has a first width not exceeding thirty-six inches and the seat frame has a second width not exceeding thirty-six inches.

In some disclosed examples, the first ends of the actuators define a first circumference, and the second ends of the actuators define a second circumference that is less than the first circumference. In some disclosed examples, the second circumference is less than ninety percent of the first circumference.

In some disclosed examples, the base is selectively supported by detachable wheels. In some disclosed examples, the detachable wheels are to facilitate movement of the base relative to an underlying surface when the detachable wheels are attached to the base.

In some disclosed examples, the actuators are operatively coupled to a control unit. In some disclosed examples, the control unit is configured to control actuation of the actuators based on first control signals received at the control unit from a flight simulator, and further based on second control signals to be sent from the control unit to the actuators in response to the first control signals.

In some disclosed examples, the control unit is mounted to the base and is located within a periphery of the base. In some disclosed examples, the control unit is configured to be powered by a one hundred twenty volt electric power supply operating at sixty hertz.

In some disclosed examples, the portable motion platform apparatus further comprises a hand control module and a foot control module. In some disclosed examples, the hand control module and the foot control module are removably couplable to the seat frame and operatively couplable to the flight simulator. In some disclosed examples, the hand control module is removably couplable to the seat frame at a first plurality of locations along the seat frame. In some disclosed examples, the foot control module is removably couplable to the seat frame at a second plurality of locations along the seat frame.

In some disclosed examples, each one of the actuators has a corresponding maximum stroke length of twelve inches or less.

In some examples, a portable motion platform apparatus is disclosed. In some disclosed examples, the portable motion platform comprises a base, a seat frame, and six actuators. In some disclosed examples, the base has a first width not exceeding thirty-six inches. In some disclosed examples, the seat frame has a second width not exceeding thirty-six inches. In some disclosed examples, the seat frame is configured to support a seat. In some disclosed examples, the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame. In some disclosed examples, the first ends define a first circumference, and the second ends define a second circumference that is less than the first circumference.

In some disclosed examples, the second circumference is less than ninety percent of the first circumference.

In some disclosed examples, the base is selectively supported by detachable wheels. In some disclosed examples, the detachable wheels are to facilitate movement of the base relative to an underlying surface when the detachable wheels are attached to the base.

In some disclosed examples, the actuators are operatively coupled to a control unit mounted to the base and located within a periphery of the base. In some disclosed examples, the control unit is configured to control actuation of the actuators based on first control signals received at the control unit from a flight simulator, and further based on second control signals to be sent from the control unit to the actuators in response to the first control signals.

In some disclosed examples, the control unit is configured to be powered by a one hundred twenty volt electric power supply operating at sixty hertz.

In some disclosed examples, the portable motion platform apparatus further comprises a hand control module and a foot control module. In some disclosed examples, the hand control module and the foot control module are removably couplable to the seat frame and operatively couplable to the flight simulator.

In some disclosed examples, each one of the actuators has a corresponding maximum stroke length of twelve inches or less.

In some examples, a portable motion platform apparatus is disclosed. In some disclosed examples, the portable motion platform apparatus comprises a base, a seat frame, and six actuators. In some disclosed examples, the base has a first width not exceeding thirty-six inches. In some disclosed examples, the base is selectively supported by detachable wheels. In some disclosed examples, the detachable wheels are to facilitate movement of the base relative to an underlying surface when the detachable wheels are attached to the base. In some disclosed examples, the seat frame has a second width not exceeding thirty-six inches. In some disclosed examples, the seat frame is configured to support a seat. In some disclosed examples, the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame.

In some disclosed examples, the first ends of the actuators define a first circumference, and the second ends of the actuators define a second circumference that is less than ninety percent of the first circumference.

In some disclosed examples, the actuators are operatively coupled to a control unit mounted to the base and located within a periphery of the base. In some disclosed examples, the control unit is configured to control actuation of the actuators based on first control signals received at the control unit from a flight simulator, and further based on second control signals to be sent from the control unit to the actuators in response to the first control signals.

In some disclosed examples, the control unit is configured to be powered by a one hundred twenty volt electric power supply operating at sixty hertz.

In some disclosed examples, the portable motion platform apparatus further comprises a hand control module and a foot control module. In some disclosed examples, the hand control module and the foot control module are removably couplable to the seat frame and operatively couplable to the flight simulator.

In some disclosed examples, each one of the actuators has a corresponding maximum stroke length of twelve inches or less.

In some examples, a portable motion platform apparatus is disclosed. In some disclosed examples, the portable motion platform apparatus comprises a base, a seat frame, six actuators, and a control unit. In some disclosed examples, the base has a first width not exceeding thirty-six inches. In some disclosed examples, the seat frame has a second width not exceeding thirty-six inches. In some disclosed examples, the seat frame is configured to support a seat. In some disclosed examples, the actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame. In some disclosed examples, the control unit is mounted to the base and is located within a periphery of the base. In some disclosed examples, the control unit is operatively coupled to the actuators. In some disclosed examples, the control unit is configured to control actuation of the actuators based on first control signals received at the control unit from a flight simulator, and further based on second control signals to be sent from the control unit to the actuators in response to the first control signals.

In some disclosed examples, the first ends of the actuators define a first circumference, and the second ends of the actuators define a second circumference that is less than ninety percent of the first circumference.

In some disclosed examples, the base is selectively supported by detachable wheels. In some disclosed examples, the detachable wheels are to facilitate movement of the base relative to an underlying surface when the detachable wheels are attached to the base.

In some disclosed examples, the control unit is configured to be powered by a one hundred twenty volt electric power supply operating at sixty hertz.

In some disclosed examples, the portable motion platform apparatus further comprises a hand control module and a foot control module. In some disclosed examples, the hand control module and the foot control module are removably couplable to the seat frame and operatively couplable to the flight simulator.

In some disclosed examples, each one of the actuators has a corresponding maximum stroke length of twelve inches or less.

In some examples, a method is disclosed. In some disclosed examples, the method comprises moving a portable motion platform through an opening located between a first area and a second area, the opening having a first width not exceeding thirty-six inches. In some disclosed examples of the method, the portable motion platform includes a base, a seat frame, and six actuators. In some disclosed examples, the base has a second width less than the first width. In some disclosed examples, the seat frame has a third width less than the first width. In some disclosed examples, the seat frame is configured to support a seat. In some disclosed examples, the six actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame.

In some disclosed examples, the method further comprises attaching detachable wheels to the base of the portable motion platform prior to moving the portable motion platform through the opening. In some disclosed examples, the method further comprises detaching the detachable wheels from the base of the portable motion platform subsequent to moving the portable motion platform through the opening.

In some disclosed examples, moving the portable motion platform through the opening includes sliding the portable motion platform along an underlying surface extending through the opening. In some disclosed examples, the detachable wheels support the base and are in contact with the underlying surface during the sliding.

In some disclosed examples, the method further comprises detaching a first hand control module from the seat frame of the portable motion platform prior to moving the portable motion platform through the opening. In some disclosed examples, the method further comprises attaching the first hand control module or a second hand control module to the seat frame subsequent to moving the portable motion platform through the opening. In some disclosed examples, the second hand control module is different from the first hand control module.

In some disclosed examples, the method further comprises detaching a first foot control module from the seat frame of the portable motion platform prior to moving the portable motion platform through the opening. In some disclosed examples, the method further comprises attaching the first foot control module or a second foot control module to the seat frame subsequent to moving the portable motion platform through the opening. In some disclosed examples, the second foot control module is different from the first foot control module.

In some examples, a method is disclosed. In some disclosed examples, the method comprises receiving first control signals at a control unit of a portable motion platform. In some disclosed examples, the first control signals are received from a flight simulator operatively coupled to the portable motion platform. In some disclosed examples of the method, the portable motion platform includes a base, a seat frame, and six actuators. In some disclosed examples, the seat frame is configured to support a seat. In some disclosed examples, the six actuators are arranged in a Stewart platform configuration. In some disclosed examples, the actuators are to move the seat frame relative to the base with six degrees of freedom. In some disclosed examples, each one of the actuators has a corresponding first end coupled to the base and a corresponding second end coupled to the seat frame. In some disclosed examples, the method further comprises generating second control signals via the control unit in response to the first control signals. In some disclosed examples, the method further comprises transmitting the second control signals from the control unit to the actuators. In some disclosed examples, the method further comprises moving the seat frame relative to the base via the actuators in response to the second control signals.

In some disclosed examples, the method further comprises transmitting third control signals to the flight simulator from a hand control module of the portable motion platform. In some disclosed examples, the first control signals are based on the third control signals. In some disclosed examples, the method further comprises transmitting fourth control signals to the flight simulator from a foot control module of the portable motion platform. In some disclosed examples, the first control signals are further based on the fourth control signals.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A portable motion platform apparatus, comprising:
- a base;
- a seat frame configured to support a seat;
- six actuators arranged in a Stewart platform configuration, the actuators to move the seat frame relative to the base with six degrees of freedom, each one of the actuators having a corresponding first end coupled to the base and a corresponding second end coupled to the seat frame; and
- a stabilizer pivotably coupled to the base, the stabilizer rotatable between a stowed position in which the stabilizer lies entirely within a periphery of the base and a deployed position in which the stabilizer extends beyond the periphery of the base, the stabilizer to provide lateral support for the base relative to an underlying surface when the stabilizer is in the deployed position.

2. The portable motion platform apparatus of claim 1, wherein the base has a first width not exceeding thirty-six inches and the seat frame has a second width not exceeding thirty-six inches.

3. The portable motion platform apparatus of claim 1, wherein locations at which the first ends of the actuators are respectively coupled to the base collectively define a first circumference, and locations at which the second ends of the actuators are respectively coupled to the seat frame collectively define a second circumference that is less than the first circumference.

4. The portable motion platform apparatus of claim 3, wherein the second circumference is less than ninety percent of the first circumference.

5. The portable motion platform apparatus of claim 1, wherein the base is selectively supported by detachable wheels.

6. The portable motion platform apparatus of claim 5, wherein the detachable wheels are to facilitate movement of the base relative to an underlying surface when the detachable wheels are attached to the base.

7. The portable motion platform apparatus of claim 1, wherein the actuators are operatively coupled to a control unit, the control unit being configured to control actuation of the actuators based on first control signals received at the control unit from a flight simulator, and further based on second control signals to be sent from the control unit to the actuators in response to the first control signals.

8. The portable motion platform apparatus of claim 7, wherein the control unit is mounted to the base and is located within a periphery of the base.

9. The portable motion platform apparatus of claim 7, wherein the control unit is configured to be powered by a one hundred twenty volt electric power supply operating at sixty hertz.

10. The portable motion platform apparatus of claim 7, further comprising a hand control module and a foot control module, the hand control module and the foot control module being removably couplable to the seat frame and operatively couplable to the flight simulator.

11. The portable motion platform apparatus of claim 10, wherein the hand control module is removably couplable to the seat frame at a first plurality of locations along the seat frame, and wherein the foot control module is removably couplable to the seat frame at a second plurality of locations along the seat frame.

12. The portable motion platform apparatus of claim 1, wherein each one of the actuators has a corresponding maximum stroke length of twelve inches or less.

13. A portable motion platform apparatus, comprising:

a base having a first width not exceeding thirty-six inches;

a seat frame having a second width not exceeding thirty-six inches, the seat frame being configured to support a seat;

six actuators arranged in a Stewart platform configuration, the actuators to move the seat frame relative to the base with six degrees of freedom, each one of the actuators having a corresponding first end coupled to the base and a corresponding second end coupled to the seat frame, wherein locations at which the first ends are respectively coupled to the base collectively define a first circumference, and locations at which the second ends are respectively coupled to the seat frame collectively define a second circumference that is less than the first circumference; and a stabilizer pivotably coupled to the base, the stabilizer rotatable between a stowed position in which the stabilizer lies entirely within a periphery of the base and a deployed position in which the stabilizer extends beyond the periphery of the base, the stabilizer to provide lateral support for the base relative to an underlying surface when the stabilizer is in the deployed position.

14. The portable motion platform apparatus of claim 13, wherein the second circumference is less than ninety percent of the first circumference.

15. The portable motion platform apparatus of claim 13, wherein the base is selectively supported by detachable wheels, the detachable wheels to facilitate movement of the base relative to an underlying surface when the detachable wheels are attached to the base.

16. The portable motion platform apparatus of claim 13, wherein the actuators are operatively coupled to a control unit mounted to the base and located within a periphery of the base, the control unit being configured to control actuation of the actuators based on first control signals received at the control unit from a flight simulator, and further based on second control signals to be sent from the control unit to the actuators in response to the first control signals.

17. The portable motion platform apparatus of claim 16, wherein the control unit is configured to be powered by a one hundred twenty volt electric power supply operating at sixty hertz.

18. The portable motion platform apparatus of claim 16, further comprising a hand control module and a foot control module, the hand control module and the foot control module being removably couplable to the seat frame and operatively couplable to the flight simulator.

19. The portable motion platform apparatus of claim 13, wherein each one of the actuators has a corresponding maximum stroke length of twelve inches or less.

20. A portable motion platform apparatus, comprising:

a base having a first width not exceeding thirty-six inches, the base being selectively supported by detachable wheels, the detachable wheels to facilitate movement of the base relative to an underlying surface when the detachable wheels are attached to the base;

a seat frame having a second width not exceeding thirty-six inches, the seat frame being configured to support a seat;

six actuators arranged in a Stewart platform configuration, the actuators to move the seat frame relative to the base with six degrees of freedom, each one of the actuators having a corresponding first end coupled to the base and a corresponding second end coupled to the seat frame; and a stabilizer pivotably coupled to the base, the stabilizer rotatable between a stowed position in which the stabilizer lies entirely within a periphery of the base and a deployed position in which the stabilizer extends beyond the periphery of the base, the stabilizer to provide lateral support for the base relative to an underlying surface when the stabilizer is in the deployed position and the detachable wheels are detached from the base.

21. The portable motion platform apparatus of claim 20, wherein locations at which the first ends of the actuators are respectively coupled to the base collectively define a first circumference, and locations at which the second ends of the actuators are respectively coupled to the seat frame collectively define a second circumference that is less than ninety percent of the first circumference.

22. The portable motion platform apparatus of claim 20, wherein the actuators are operatively coupled to a control unit mounted to the base and located within a periphery of the base, the control unit being configured to control actuation of the actuators based on first control signals received at the control unit from a flight simulator, and further based on second control signals to be sent from the control unit to the actuators in response to the first control signals.

23. The portable motion platform apparatus of claim 22, wherein the control unit is configured to be powered by a one hundred twenty volt electric power supply operating at sixty hertz.

24. The portable motion platform apparatus of claim 22, further comprising a hand control module and a foot control module, the hand control module and the foot control module being removably couplable to the seat frame and operatively couplable to the flight simulator.

25. The portable motion platform apparatus of claim 20, wherein each one of the actuators has a corresponding maximum stroke length of twelve inches or less.

26. A method, comprising:

moving a portable motion platform through an opening located between a first area and a second area, the opening having a first width not exceeding thirty-six inches, the portable motion platform including:

a base having a second width less than the first width;

a seat frame having a third width less than the first width, the seat frame being configured to support a seat;

six actuators arranged in a Stewart platform configuration, the actuators to move the seat frame relative to the base with six degrees of freedom, each one of the actuators having a corresponding first end coupled to the base and a corresponding second end coupled to the seat frame; and a stabilizer pivotably coupled to the base, the stabilizer rotatable between a stowed position in which the stabilizer lies entirely within a periphery of the base and a deployed position in which the stabilizer extends beyond the periphery of the base, the stabilizer to provide lateral support for the base relative to an underlying surface when the stabilizer is in the deployed position;

rotating the stabilizer from the deployed position into the stowed position prior to moving the portable motion platform through the opening; and rotating the stabilizer from the stowed position into the deployed position subsequent to moving the portable motion platform through the opening.

27. The method of claim 26, further comprising:

attaching detachable wheels to the base of the portable motion platform prior to moving the portable motion platform through the opening; and detaching the detachable wheels from the base of the portable motion platform subsequent to moving the portable motion platform through the opening.

28. The method of claim 27, wherein moving the portable motion platform through the opening includes sliding the portable motion platform along an underlying surface extending through the opening, the detachable wheels supporting the base and being in contact with the underlying surface during the sliding.

29. The method of claim 26, further comprising:

detaching a first hand control module from the seat frame of the portable motion platform prior to moving the portable motion platform through the opening; and attaching the first hand control module or a second hand control module to the seat frame subsequent to moving the portable motion platform through the opening, the second hand control module being different from the first hand control module.

30. The method of claim 26, further comprising:

detaching a first foot control module from the seat frame of the portable motion platform prior to moving the portable motion platform through the opening; and attaching the first foot control module or a second foot control module to the seat frame subsequent to moving the portable motion platform through the opening, the second foot control module being different from the first foot control module.

31. The method of claim 26, wherein each one of the actuators has a corresponding maximum stroke length of twelve inches or less.

* * * * *